(12) United States Patent
Igarashi et al.

(10) Patent No.: US 8,760,806 B2
(45) Date of Patent: Jun. 24, 2014

(54) MICROWAVE ASSISTED MAGNETIC RECORDING HEAD AND MICROWAVE ASSISTED MAGNETIC RECORDING APPARATUS HAVING A MAGNETIC FLUX RECTIFYING LAYER WITH A MAGNETIC FLUX RECTIFYING ACTION

(75) Inventors: Masukazu Igarashi, Kawagoe (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 12/990,132

(22) PCT Filed: Apr. 21, 2009

(86) PCT No.: PCT/JP2009/057882
§ 371 (c)(1),
(2), (4) Date: Oct. 28, 2010

(87) PCT Pub. No.: WO2009/133786
PCT Pub. Date: Nov. 5, 2009

(65) Prior Publication Data
US 2011/0043943 A1  Feb. 24, 2011

(30) Foreign Application Priority Data

Apr. 28, 2008  (JP) .................................. 2008-116546

(51) Int. Cl.
*G11B 5/127* (2006.01)
(52) U.S. Cl.
USPC ........................................ 360/125.3; 360/128
(58) Field of Classification Search
USPC .................. 360/313–328, 125.3, 125.71, 128
See application file for complete search history.

(56) References Cited

U.S. PATENT DOCUMENTS

| 7,256,955 | B2 | 8/2007 | Pokhil et al. | |
|---|---|---|---|---|
| 2003/0021063 | A1* | 1/2003 | Kuroda et al. | 360/125 |
| 2006/0198047 | A1 | 9/2006 | Xue et al. | |
| 2006/0222835 | A1 | 10/2006 | Kudo et al. | |
| 2007/0253106 | A1 | 11/2007 | Sato et al. | |
| 2008/0019040 | A1* | 1/2008 | Zhu et al. | 360/110 |
| 2008/0024918 | A1 | 1/2008 | Gouke | |
| 2009/0052095 | A1 | 2/2009 | Yamada et al. | |

FOREIGN PATENT DOCUMENTS

| JP | 07-244801 | 9/1995 |
|---|---|---|
| JP | 2002-092820 | 3/2002 |
| JP | 2002-100005 | 4/2002 |
| JP | 2006-244693 | 9/2006 |

(Continued)

OTHER PUBLICATIONS

Office Action issued Japanese Patent Application No. 2010-510082 on Sep. 25, 2012.

*Primary Examiner* — Joseph Feild
*Assistant Examiner* — Gustavo Polo
(74) *Attorney, Agent, or Firm* — Antonelli, Terry, Stout & Kraus, LLP.

(57) ABSTRACT

With respect to microwave assisted magnetic recording, high-density information recording is performed by forming a favorable write magnetic domain on a recording medium. The recording medium is placed in a magnetically resonant state by generating a microwave, and information is recorded. A recording medium 7 comprises parts 17 and 18 with differing magnetic anisotropy fields. Recording is performed using, for the frequency of the microwave, a frequency that places the part 17, which has smaller magnetic anisotropy, in a resonant state. Recording density of an information recording apparatus can be increased, while at the same time also improving reliability. Consequently, it becomes possible to reduce costs.

16 Claims, 16 Drawing Sheets

(56) References Cited

FOREIGN PATENT DOCUMENTS

| JP | 2006-286855 | 10/2006 |
| JP | 2007-299460 | 11/2007 |
| JP | 2008-34060 | 2/2008 |
| JP | 2008-071383 | 3/2008 |
| JP | 2009-070541 | 4/2009 |

* cited by examiner

Direction of head running

Direction of medium running (A)

(B)

(A)

(B)

(A)

(B)

(C)

(D)

Direction of head running

MICROWAVE ASSISTED MAGNETIC RECORDING HEAD AND MICROWAVE ASSISTED MAGNETIC RECORDING APPARATUS HAVING A MAGNETIC FLUX RECTIFYING LAYER WITH A MAGNETIC FLUX RECTIFYING ACTION

TECHNICAL FIELD

The present invention relates to an information recording apparatus having functions of exciting magnetic resonance by irradiating a magnetic recording medium with a high-frequency magnetic field (hereinafter referred to as a microwave), inducing magnetization switching of the recording medium, and recording information.

BACKGROUND ART

In magnetic recording, it is necessary to reduce recording bit size in order to increase recording density. However, in order to stably maintain small recording bits on a recording medium, the recording medium must be made using a magnetic material with high magnetic anisotropy (or high magnetic coercive force). In order to perform a write operation with respect to a recording medium with high magnetic anisotropy, recording has to be performed using a write magnetic field of commensurate strength, but it is said that the write magnetic field intensity of write heads will become inadequate in the future. As such, as in microwave assisted magnetic recording, thermally assisted magnetic recording, etc., recording methods are being studied where recording is performed by temporarily reducing the anisotropy field of a medium only when magnetic recording is performed.

In microwave assisted magnetic recording, a recording medium is locally excited by irradiating areas on the order of nanometers with a strong high-frequency magnetic field in the microwave band, and information is recorded by thus reducing the magnetization switching field. Because magnetic resonance is utilized, unless a microwave with a frequency that is proportionate to the anisotropy field of the medium is used, significant magnetization switching field reduction effects cannot be attained.

JP7-244801A discloses a technique for recording information by performing Joule heating or magnetic resonance heating on a magnetic recording medium by means of a high-frequency magnetic field, and thus locally reducing the magnetic coercive force of the medium. In addition, U.S. Pat. No. 7,256,955 discloses a technique for recording information by applying to a recording medium a magnetic field in which a perpendicular magnetic write head drive current is modulated with a high frequency current, inducing a high frequency magnetic field in the magnetic recording medium, and locally placing the recording medium in a state of magnetic resonance, thereby reducing the magnetization switching field. In addition, JP2007-299460A discloses a technique for performing microwave assisted magnetic recording by providing, besides a main coil for main pole excitation and on a magnetic head, a small auxiliary coil for generating microwaves.

On the other hand, in TMR 2007-B6, the paper submission for an oral session at the 2007 TMRC (The Magnetic Recording Conference) international conference, there is disclosed a technique for performing microwave assisted magnetic recording by generating microwaves by disposing, near a magnetic recording medium adjacent to a main pole of a perpendicular magnetic head, a magnetization rotation body that rotates at high speed by way of a spin torque.

Patent Document 1: JP7-244801A
Patent Document 2: U.S. Pat. No. 7,256,955
Patent Document 3: JP2007-299460A
Non-Patent Document 1: TMR 2007-B6

DISCLOSURE OF THE INVENTION

Problems to be Solved by the Invention

In order to achieve, through microwave assisted magnetic recording, a recording density of the level that is currently envisioned for the next generation of magnetic recording schemes (i.e., approximately 2 Tbits per square inch), the size of the microwave irradiated area would be on the order of nanometers. For purposes of irradiating an area of this size with strong microwaves, none of the conventional techniques discussed above are sufficient in performance.

For example, in the technique disclosed in JP7-244801A, a magnetic recording medium is irradiated with microwaves by providing a cavity resonator in a magnetic head slider. However, if microwaves on the order of gigahertz, which is the current requirement, were to be generated, the size of the cavity resonator would be approximately several millimeters. Therefore, the invention disclosed in JP7-244801A would be difficult to mount in a magnetic head slider, and would thus be unrealistic. Further, in the invention disclosed in U.S. Pat. No. 7,256,955, since a write head drive current is modulated with a high frequency current, the direction of the magnetic field from the magnetic pole part of the magnetic write head would align with the direction of the high frequency magnetic field. It would therefore be difficult to create a state of magnetic resonance. Further, with the invention disclosed in JP2007-299460A, an AC current on the order of gigahertz would have to be supplied to an auxiliary coil in order to generate an AC magnetic field on the order of gigahertz, however, no currently existing AC amplifier is capable of operating at such high speeds while supplying a sufficient current. In addition, the area irradiated with the AC magnetic field cannot be so limited as to be on the order of nanometers either.

In the conventional technique disclosed in TMR 2007-B6, it is possible to record information by reducing the magnetization switching field by irradiating areas on the order of nanometers with strong microwaves to locally place the recording medium in a state of magnetic resonance. However, the magnetization rotation body whose magnetization rotates by way of a spin torque is fixed to the direction of the fringing field from the main pole and is incapable of high-frequency oscillation.

An object of the present invention is to realize a magnetic head or an information recording apparatus that employs microwave assisted magnetic recording of a scheme in which microwaves are generated using a magnetization rotation body, the microwave assisted magnetic recording being capable of stably generating microwaves by reducing the influence of a fringing field from a main pole.

Means for Solving the Problems

In the present invention, an opposing pole for forming a magnetic circuit (for returning a magnetic flux) is provided on the trailing side or the leading side of a main pole of a write head part. A film having a rectifying action with respect to a magnetic flux is provided on an end part of the air bearing surface of the main pole on the side facing the opposing pole. A high-frequency generating part is provided between the magnetic flux rectifying film and an end part of the air bearing surface of the above-mentioned opposing pole. A head structure for microwave assisted magnetic recording that is capable of stably generating microwaves by reducing influences of a fringing field from the main pole is thus realized.

A film having a rectifying action with respect to a magnetic flux is realized, for example, by providing a protruding part on the end part of the air bearing surface of the main pole on the side of the face of the above-mentioned opposing pole. This protruding part may be integrated with the main pole, or it may also be provided as a magnetic body that is separate from the main pole. The protruding part is sometimes referred to as a lip.

The above-mentioned high-frequency generating part is realized by adjacently disposing a magnetization rotation body and a spin rectifier between the above-mentioned main pole and opposing pole. The magnetization rotation body and the spin rectifier may be configured with a single film, or they may also be configured by stacking a plurality of films.

By providing the above-mentioned protruding part, of the magnetic flux that flows into the high-frequency magnetic field generating part from the main pole, the component with a direction that is perpendicular to the film plane increases. Thus, the extent to which rotation of the magnetization of the magnetization rotation body is inhibited by the fringing field from the main pole is reduced. Consequently, it is possible to realize a high-frequency magnetic field generating part that is capable of oscillating more stably than is conventional, and it is possible to realize a magnetic head or an information recording apparatus that is suited for microwave assisted magnetic recording.

EFFECTS OF THE INVENTION

It is possible to realize an information recording apparatus whose recording density exceeds 2 Tbits per square inch, while at the same time improving reliability, as a result of which it becomes possible to reduce costs.

DESCRIPTION OF SYMBOLS

Figure 1A:
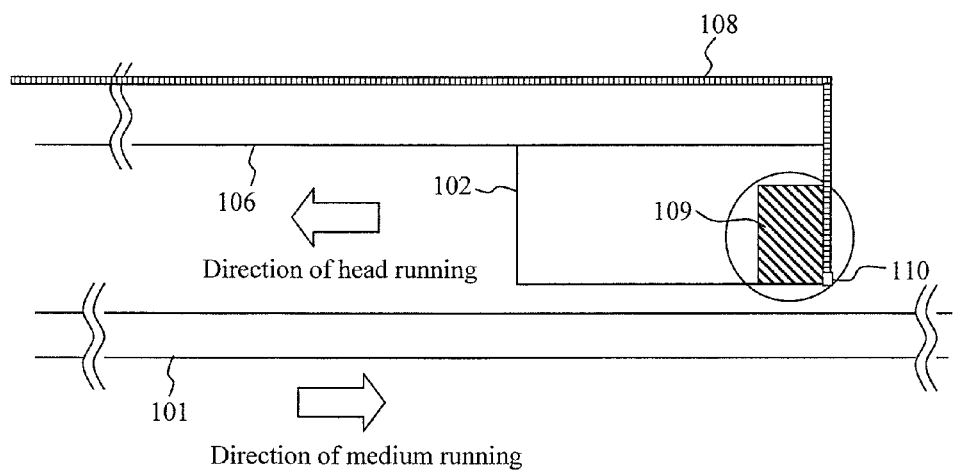
FIG. 1A is a view showing configuration examples of a magnetic head slider and a magnetic head.

1 . . . First perpendicular magnetic anisotropy body
2 . . . Magnetization rotation body layer
3 . . . Metal non-magnetic spin conduction layer
4 . . . Second perpendicular magnetic anisotropy body (spin injection layer)
5 . . . Main pole
6 . . . Opposing pole
7 . . . Recording medium
8 . . . Lip
11 . . . Negative perpendicular magnetic anisotropy body
12 . . . Metal non-magnetic spin scattering body
13 . . . Opposing pole-side lip
14 . . . Side shield
15 . . . Metal non-magnetic spin conduction layer
16 . . . Recording layer
17 . . . Upper recording layer
18 . . . Lower recording layer
19 . . . Substrate
25 . . . Positive electrode
26 . . . Negative electrode
27 . . . Positive electrode
28 . . . Negative electrode
31 . . . Antiferromagnetic layer
32 . . . Fixed layer
33 . . . CoFeB 35 . . . Insulation layer (MgO)
36 . . . CoFeB
37 . . . Free layer
41 . . . Spin rectifier
43 . . . Rotation guide layer
48 . . . Magnetic flux rectifying film
56 . . . First upper recording layer
57 . . . Second upper recording layer
58 . . . Lower recording layer
65 . . . First upper recording layer
66 . . . Second upper recording layer
67 . . . Third upper recording layer
101 . . . Recording medium
102 . . . Slider
103 . . . Rotary actuator
104 . . . Rotation bearing
105 . . . Arm
106 . . . Suspension
108 . . . Wiring
109 . . . Magnetic head part
110 . . . Processor
111 . . . Memory
112 . . . Channel IC
113 . . . IC amplifier
120 . . . Substrate
121 . . . Interlayer
122 . . . Perpendicular magnetic recording film
200 . . . Write head
201 . . . High-frequency magnetic field generator
202 . . . High-frequency magnetic field detector
203 . . . High-frequency magnetic field detector
205 . . . Coil
206 . . . Auxiliary pole
207 . . . Read sensor
208 . . . Lower shield
209 . . . Insulation film
210 . . . Upper shield

BEST MODE FOR CARRYING OUT THE INVENTION

The principles by which a high-frequency magnetic field is generated by a magnetization rotation body and a spin rectifier are described below with reference to FIG. 1A through FIG. 3. These principles apply to all of the embodiments later described herein.

Figure 1B:
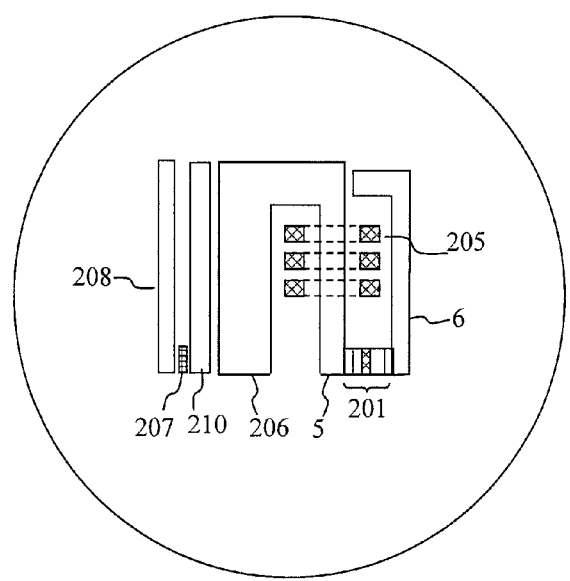
FIG. 1B is an enlarged view of a magnetic head part.

FIG. 1A and FIG. 1B show a basic configuration of a microwave assisted magnetic recording head comprising a magnetization rotation body, a spin rectifier and a magnetic flux rectifying film.

FIG. 1A is a view schematically showing the positional relationship between a magnetic head slider and a magnetic recording medium. A magnetic head slider 102 is supported facing a recording medium 101 by means of a suspension 106. In FIG. 1A, it is assumed that the recording medium 101 rotates to the right of the sheet, and that the opposing magnetic head slider moves to the left of the sheet relative to the recording medium. Thus, in FIG. 1A, a magnetic head part 109 would happen to be disposed on the trailing side of the slider. Drive currents for the respective elements of the magnetic head part 109 are fed by wiring 108 and supplied to the respective elements by a terminal 110.

FIG. 1B shows an enlarged view of the magnetic head part 109 shown in FIG. 1A. The magnetic head 109 comprises a write head part and a read head part. The write head part comprises an auxiliary pole 206, a high-frequency magnetic field generator 201 disposed between a main pole 5 and an opposing pole 6, a coil 205 that excites the main pole, etc. The read head part comprises a read sensor 207 disposed between a lower shield 208 and an upper shield 210, etc. In some cases, the auxiliary pole 206 may double as the upper shield 210, or vice versa. Although not shown in the drawings, the excitation current for the coil, the drive current for the read sensor, and the current applied to the high-frequency magnetic field generator are supplied by means of current supplying terminals respectively provided per element.

As shown in FIG. 1B, the opposing pole 6 extends towards the main pole 5 at the upper portion of the diagram, and forms a mutually magnetic circuit. However, it is assumed that it is substantially insulated electrically at the upper portion of the diagram. The magnetic circuit is one in which magnetic field lines form closed paths, and it need not be formed solely of magnetic bodies. Further, an auxiliary pole, etc., may be disposed on the opposite side of the main pole 5 relative to the opposing pole 6 to form a magnetic circuit. In this case, the main pole 5 and the auxiliary pole need not be electrically insulated. The main pole 5 and the opposing pole 6 comprise electrodes, or means for electrically contacting electrodes, and are configured in such a manner that a high-frequency excitation current can be passed via a magnetization rotation body layer from the side of the main pole 5 to the side of the opposing pole 6, or vice versa.

Figure 1C:
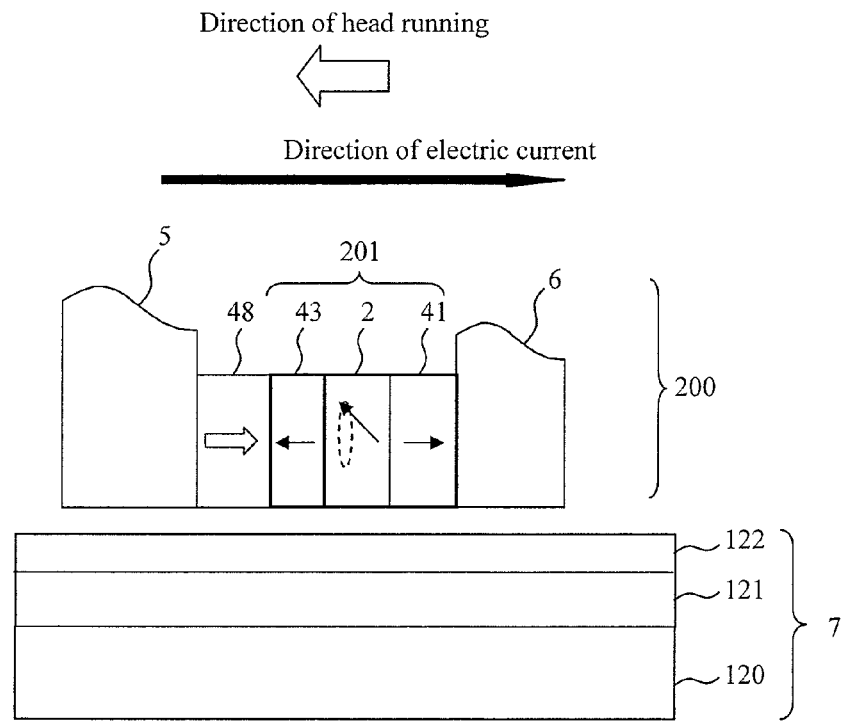
FIG. 1C is an enlarged view of a write head part.

FIG. 1C is a further enlarged view of the write head part shown in FIG. 1B. A magnetic flux rectifying film 48 is formed on the trailing side of the air bearing surface end part of the main pole 5, and the high-frequency magnetic field generator 201 is formed between this magnetic flux rectifying film 48 and the opposing pole 6. A steady state current flows between the main pole 5 and the opposing pole 6 in the direction of the arrow in black shown in the diagram, and the relative direction of head running is in the direction indicated by the white arrow with black outlines. For a magnetic recording medium 7, a medium in which a perpendicular magnetic recording film 122 is stacked on a substrate 120 with an interlayer 121 interposed therebetween was used.

The high-frequency magnetic field generator 201 has such a structure where the following are laterally stacked between the main pole 5 and the opposing pole 6: a first perpendicular magnetic anisotropy layer as a rotation guide layer 43; a magnetization rotation layer 2; and, as a spin rectifier 41, a second perpendicular magnetic anisotropy layer having a metal non-magnetic spin conduction layer on the surface that is in contact with the magnetization rotation layer 2. The magnetization directions of the first and second perpendicular magnetic anisotropy layers are in mutually opposite directions as in the directions of the arrows shown in the diagram (perpendicular to the film plane). Due to the action of the rotation guide layer 43, the magnetization direction of the magnetization rotation layer 2 is in a direction that is approximately parallel to the magnetization direction of the rotation guide layer 43 and perpendicular to the film plane. The perpendicular magnetic anisotropy layers may comprise a material having negative perpendicular magnetic anisotropy. Negative perpendicular magnetic anisotropy will be described in detail in Embodiment 3.

When an electric current is passed through a stacked film of such a structure from the main pole 5 to the opposing pole 6, electrons travel from the opposing pole 6 to the main pole 5 via the various layers. In so doing, the spin rectifier 41 acts as a spin rectifier for the electrons, and supplies the electrons, whose spin is aligned rightward, to the magnetization rotation layer 2 on the left. The electrons supplied from the spin rectifier 41 to the magnetization rotation layer 2 so act as to exert a spin torque on the magnetization rotation layer 2 and to try to turn the magnetization of the magnetization rotation layer 2 to the right (action 1). On the other hand, there is already an action, of trying to turn it to the left, at work on the magnetization rotation layer 2 from the rotation guide layer 43 (action 2). Further, the fringing field from the main pole 5 also acts to try to turn the magnetization of the magnetization rotation layer 2 in its own direction (action 3). The magnetization direction of the magnetization rotation layer 2 is determined by the balance between action 1, action 2 and action 3, but there occurs a torque that tries to restore it to a direction determined by action 2 and action 3, and it rotates rapidly in the film plane. Consequently, an ac magnetic field is generated with a dc current (hereinafter referred to as high-frequency excitation current). The resultant ac magnetic field is greatest when action 1, action 2 and action 3 cancel one another out and the direction of the magnetization rotation layer 2 is in the film plane. The metal non-magnetic spin conduction layer is provided in the spin rectifier 41 on the surface that is in contact with the magnetization rotation layer 2 to prevent magnetic bodies from coming into direct contact and interacting with each other, and to only pass spin (electrons). The second perpendicular magnetic anisotropy layer can be placed in a state where, from among electrons that flow in from the opposing pole 6, just the spin in its magnetization direction can be extracted.

With the high-frequency magnetic field generator 201 of the configuration above, the direction of action 3 switches depending on the polarity of the fringing field of the main pole 5. As a result, there is a disadvantage in that the strength of the generated ac magnetic field would vary depending on the polarity of the fringing field from the main pole 5. In using it, it is necessary to find a point that is not influenced by polarity by varying the magnitude of the current. Further, since the frequency of the high-frequency magnetic field is proportional to the current, it is necessary to adjust the resonant frequency of the medium to be recorded on. The magnetic flux rectifying layer 48 (lip) is so designed as to rectify the direction of the fringing field from the main pole 5 and minimize magnetic field components that are parallel to the film plane of the magnetization rotation layer 2. When there are magnetic field components that are parallel to the film plane of the magnetization rotation layer 2, the magnetization of the magnetization rotation layer 2 becomes fixed in that direction, and high-frequency oscillation becomes impossible. When an electric current is passed in the reverse direction, the direction of action 1 would become reversed to align with the direction of action 2. Thus, since there is not generated any magnetization component that is parallel to the film plane of the magnetization rotation layer 2, high-frequency oscillation is not possible.

By providing a different metal non-magnetic spin conduction layer on the surface of the magnetic flux rectifying layer 48 (lip) on the side of the magnetization rotation layer 2, it becomes possible to reduce the influence of the polarity of the fringing field from the main pole 5. In so doing, the magnetic flux rectifying layer 48 also acts as a spin rectifier for electrons, and takes away electrons, whose spin is aligned in the magnetization direction of the main pole 5, from the magnetization rotation layer 2 or the rotation guide layer 43 on the right, and a spin torque that tries to turn the magnetization of the magnetization rotation layer 2 in the opposite direction to the magnetization of the main pole 5 comes into play (action 4). When an electric current is passed in the direction indicated in FIG. 1C, action 3 and action 4 mentioned above are in opposite directions, and it is possible to effect a configuration where a spin torque is at work in such a direction as to suppress the influence of the magnetic field from the main pole on the magnetization rotation body.

Figure 1D:
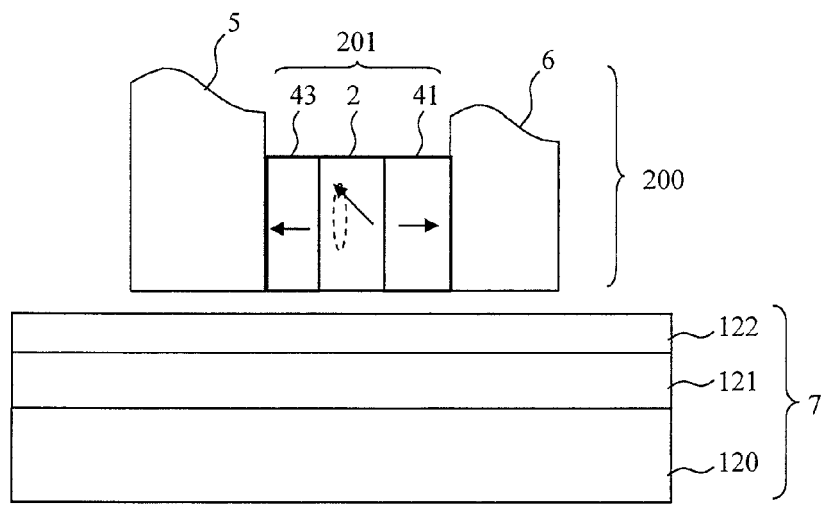
FIG. 1D is a view showing a test-produced magnetic head of a conventional structure.

For purposes of comparison, a sample head of a conventional structure without a magnetic flux rectifying film 48 was produced and its properties were tested. The sample magnetic head of a conventional structure that was produced is shown in FIG. 1D. Through calculations using a 3D field simulator, it is understood that a magnetic field of approximately 0.1 MA/m is applied to the magnetization rotation body layer 2 in the up/down direction in the diagram. Using a spinstand, magnetic recording was performed with a head-medium spacing of 5 nm and a track pitch of 20nm. Further, although this was read with a GMR head with a shield gap of 20 nm, no read output was obtained even when the magnitude and direction of the high-frequency excitation current were varied, or when the medium was changed. In addition, in order to see whether a microwave magnetic field was actually generated, a high-frequency magnetic field detector 203 was disposed on the opposite side of the recording medium 7 with the high-frequency magnetic field generator 201 in-between to monitor the strength of the microwave magnetic field. However, no high-frequency output was obtained. It is speculated that due to the fringing of the main pole 5, the magnetization of the magnetization rotation body layer 2 has become magnetized in the direction of this fringing field, and high-frequency oscillation is thus not occurring.

The fact that the cause of assistance is the magnetic resonance of the medium will now be verified through simulation. Assuming that magnetic particles having uniaxial magnetic anisotropy switch in accordance with a single-domain model, the behavior of that magnetization was calculated using the LLG (Landau-Lifschitz-Gilbert) equation below.

[Equation 1]

$$(1+\alpha^2)\frac{d\vec{M}}{dt} = -\gamma(\vec{M} \times \vec{H'}), \quad (1)$$

$$\vec{H'} = \vec{H} + \alpha\frac{\vec{M} \times \vec{H}}{M}$$

Figure 2:
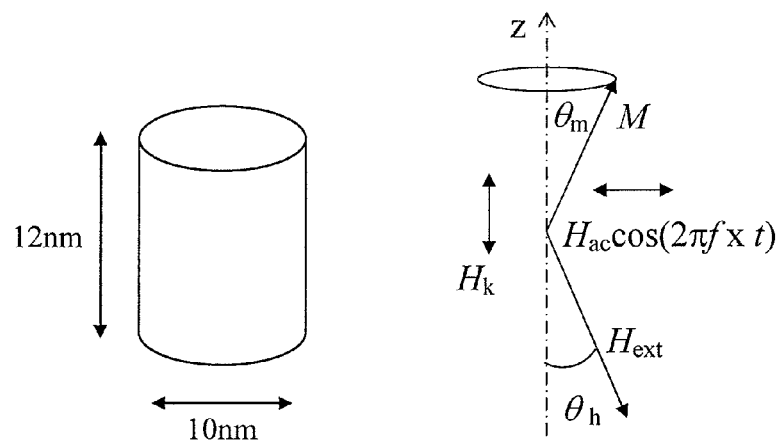
FIG. 2 is a view showing the application directions of the effective magnetic fields of a simulated model.

$\gamma$ denotes the gyromagnetic constant, and $\alpha$ the damping factor. Effective magnetic field H is formed of the sum of four components, namely magnetic anisotropy field $H_a$ ($=H_k \cos\theta_m$, where $\theta_m$ is the angle foamed between magnetization and the magnetization easy axis), static magnetic field $H_d$, external magnetic field $H_{ext}$, and high-frequency magnetic field $H_{ac}$. In an actual write head, $H_{ext}$ corresponds to the write magnetic field from the main pole, and $H_{ac}$ to the ac magnetic field from the high-frequency generator. The directions in which effective magnetic fields are applied are shown in FIG. 2. With the vertical direction as the z-direction, $H_a$ was applied. $H_{ext}$ was applied in a direction that is the opposite of the initial magnetization direction and inclined by $\theta_h$ from the vertical direction. Magnetization switches while performing a rotating motion about the z-axis generally from the +z direction towards the −z direction. In FIG. 2, the direction in which the high-frequency magnetic field $H_{ac}$ was applied is shown to be the horizontal direction. However, a linear oscillation field can be decomposed into, as represented by the equation below, an anticlockwise component and a clockwise component.

[Equation 2]

$$H_{ac}\cos(2\pi ft) = H_{ac}\left(\left(\frac{\cos(2\pi ft)+\sin(2\pi ft)}{2}\right) + \left(\frac{\cos(2\pi ft)-\sin(2\pi ft)}{2}\right)\right) \quad (2)$$

Of the above, since the clockwise component rotates in the opposite direction relative to the precession of the magnetization, it is speculated based on the principles of magnetic resonance that it is completely irrelevant to resonance. Assuming that magnetic resonance is the cause of assistance, it is anticipated that there would occur a significant difference in assisting effect between an anticlockwise oscillation field and a clockwise oscillation field.

Figure 3:
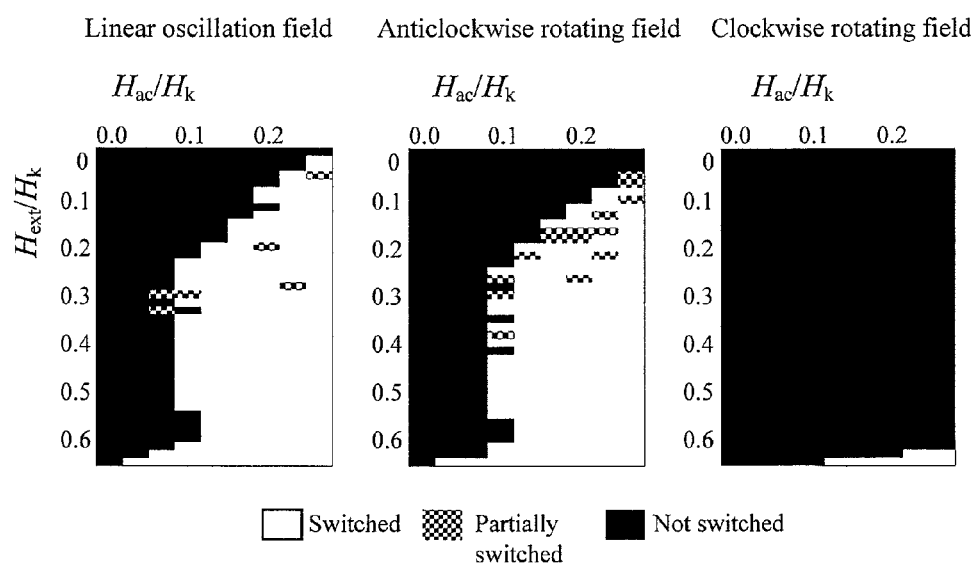
FIG. 3 is a diagram showing the switching behaviors of a linear oscillation field, an anticlockwise oscillation field, and a clockwise oscillation field.

FIG. 3 shows the result of examining the status of switching with respect to a linear oscillation field, an anticlockwise oscillation field and a clockwise oscillation field, while varying $H_{ac}$ and $H_{ext}$. In the diagram, white squares represent areas for which magnetization switching was completed within 3 ns, checkered marks represent partially switched areas, and black squares represent areas whose magnetization did not switch. From the diagram, with the clockwise oscillation field component, switching is completely absent up to a Stoner-Wohlfarth magnetic field (a magnetic field that brings an isolated magnetic particle to magnetization switching. It varies with the angle between the magnetization easy axis and the applied magnetic field, where, in the present case, $H_{ext}/H_k=0.6$) and it was thus confirmed that, indeed, magnetic resonance is the cause of assistance.

It is noted that while the rotation guide layer, the magnetization rotation layer and the spin rectifier are realized with a single-layer film in the write head structure in FIG. 1C described above, they may also comprise a plurality of stacked films. Alternatively, the functions of the magnetization rotation layer and the spin rectifier may also be realized as overall actions of a layer disposed in the high-frequency magnetic field generator 201 in a separated manner. Further, although in the description above the magnetic flux rectifying film 48 is described as being a layer provided separately from the main pole, it may also be formed as a protruding part attached to the main pole.

Thus, through the configuration of the present embodiment, it becomes possible to realize a microwave assisted magnetic recording head that is capable of stable oscillation.
Embodiment 1

In the present embodiment, there will be described an example where an information recording apparatus is configured by combining a microwave assisted magnetic recording head that comprises the magnetic flux rectifying film 48 described above with a magnetic recording medium that comprises an artificial lattice film.

Figure 4:
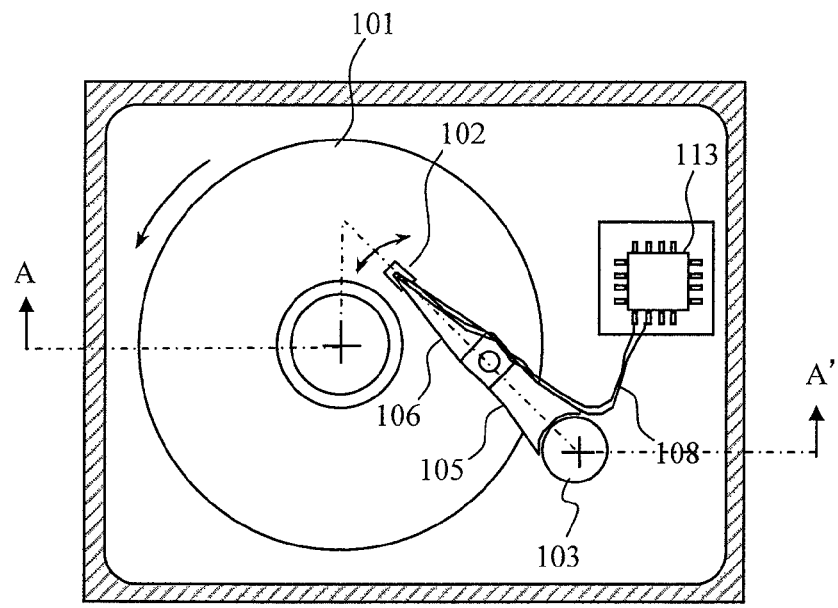
FIG. 4 is an overall configuration diagram of a magnetic disk apparatus.
Figure 4:
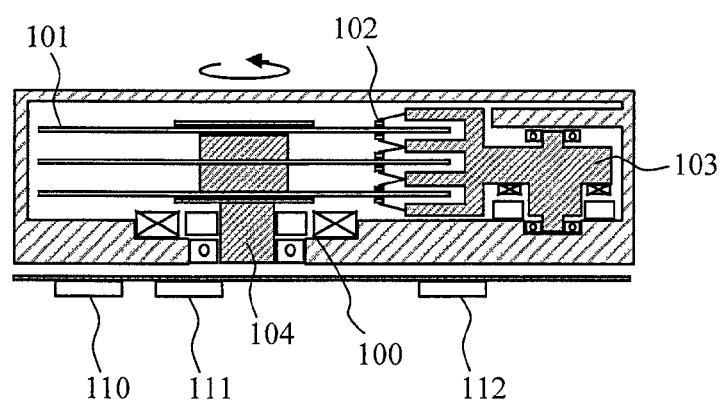

FIG. 4(A) and FIG. 4(B) are schematic views showing the overall configuration of the information recording apparatus of the present embodiment. FIG. 4(A) is a top view, and FIG. 4(B) is a sectional view along A-A' thereof. The recording medium 101 is secured to a rotation bearing 104, and rotates by means of a motor 100. In FIG. 4, a description is provided using an example where three magnetic disks and six magnetic heads are mounted. However, there need only be one or more magnetic disks, and one or more magnetic heads. The recording medium 101 has a disk shape, and has recording layers formed on both sides thereof. A slider 102 travels over the rotating recording medium surface in an approximately radial direction and comprises a magnetic head at the tip part on the leading side or the trailing side. The suspension 106 is supported by a rotary actuator 103 via an arm 105. The suspension 106 has the function of pressing the slider 102 against the recording medium 101 with a predetermined load or pulling it away therefrom. Electric currents for driving the various elements of the magnetic head are supplied from an IC amplifier 113 via the wiring 108. The processing of write signals supplied to the write head part and of read signals detected from the read head part is executed by the read/write channel IC 112 shown in FIG. 4(B). In addition, control actions for the information processing apparatus as a whole are attained by having a disk control program that is stored in memory 111 executed by a processor 110. Accordingly, in the case of the present embodiment, the processor 110 and the memory 111 form a so-called disk controller.

Figure 5:
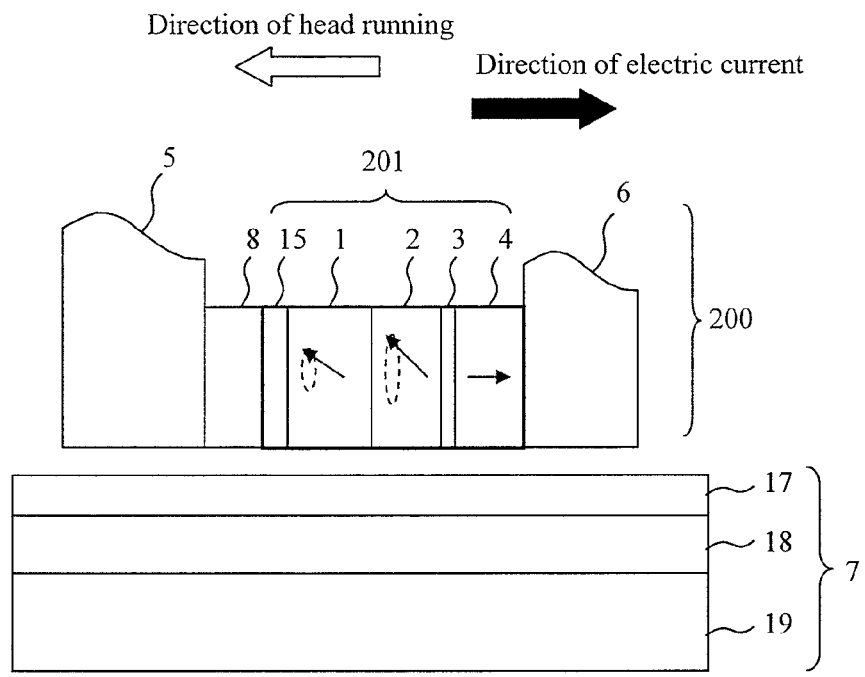
FIG. 5 is a configuration diagram (sectional view) of a write head part of Embodiment 1.

FIG. 5 is a schematic view showing the structure of a write head part of an information processing apparatus of the present embodiment. As for the overall configurations of the magnetic head slider and the magnetic head, since they are similar to the configurations shown in FIG. 1A and FIG. 1B, descriptions thereof are omitted.

The high-frequency magnetic field generator 201 of the present embodiment has such a configuration where the following are laterally stacked: a metal non-magnetic spin conduction layer 15; a first perpendicular magnetic anisotropy body 1; a magnetization rotation body layer 2; a metal non-magnetic spin conduction layer 3; and a second perpendicular magnetic anisotropy body 4 (spin injection layer). The high-frequency magnetic field generator 201 has such a configuration where these stacked films are disposed between the main pole 5 and the opposing pole 6. With respect to the configuration shown in FIG. 1C, the spin rectifier 41 corresponds to a stacked structure of the metal non-magnetic spin conduction layer 3 and the second perpendicular magnetic anisotropy body 4, the rotation guide layer 43 to the first perpendicular magnetic anisotropy body 1, and the magnetic flux rectifying film 48 to the magnetic flux rectifying layer 8 (lip). It is noted that the form of the high-frequency magnetic field generator 201 is a columnar structure extending in the left/right direction in the diagram, and its section has a rectangular shape that is elongate in a direction along the air bearing surface. Because shape anisotropy occurs by employing a rectangular shape, the magnetization of the magnetization rotation body layer 2, when not in a state of oscillation, becomes parallel to the air bearing surface, and it is possible to prevent unwanted magnetization switching, etc., due to fringing fields.

The length of this rectangle in the direction along the air bearing surface (the longitudinal direction or the direction facing the trailing side from the leading side) is an important factor that determines the write track width, and was defined as being 15 nm in the present embodiment. In microwave assisted magnetic recording, since there is used a recording medium with such high magnetic anisotropy that recording cannot be performed unless the write magnetic field from the main pole 5 and the high-frequency magnetic field from the magnetization rotation body layer 2 are aligned, the width and thickness (length in the direction of head running) of the main pole 5 may be set on the large side so that a greater write magnetic field may be secured. In the present embodiment, by having the width be 80 nm and the thickness 100 nm, a write magnetic field of approximately 0.9 MA/m was attained. For the magnetic flux rectifying layer 8, there was used a material whose saturation magnetization was the same as or greater than that of the main pole 5. Using a 3D field simulator, the thickness of the magnetic flux rectifying layer 8 was so designed that the magnetic field from the main pole 5 would be perpendicular to the layer direction of the magnetization rotation body layer 2.

The thickness of the magnetic flux rectifying layer 8 in the present embodiment was 11 nm. However, this value is dependent on the shape of the aforementioned rectangle, the distance to and state of the opposing pole, the state of the medium used, and the state of the magnetic circuit in the upper part of the diagram. For the perpendicular magnetic anisotropy body 1, the [001] plane of hexagonal CoCrPt was so arranged as to be in the left/right direction in the diagram, and one whose magnitude of magnetic anisotropy was $5.1 \times 10^5$ J/m$^3$ was used. The material of the main pole 5 and the opposing pole 6 was a CoFe alloy, which has high saturation magnetization and hardly any magnetocrystalline anisotropy.

The magnetization rotation body layer 2 was a 20-nm-thick CoFe alloy, which has high saturation magnetization and hardly any magnetocrystalline anisotropy. At the magnetization rotation body layer 2, magnetization rotates at high speed within a plane that is generally parallel to the layer, and the fringing field from a magnetic pole that appears in the air bearing surface acts as a high-frequency magnetic field. The magnetization rotation drive source of the magnetization rotation body layer 2 is the spin torque that flows in from the second perpendicular magnetic anisotropy body 4 (spin injection layer) via the metal non-magnetic spin conduction layer 3. In addition, in the present embodiment, since the metal non-magnetic spin conduction layer 15 is provided at the interface between the magnetic flux rectifying layer 8 (lip) and the first perpendicular magnetic anisotropy body 1, it becomes possible to reduce the influence of the polarity of the fringing field from the main pole 5. This is because the magnetic flux rectifying layer 8 also acts as a spin rectifier for electrons, and takes away, from the first perpendicular magnetic anisotropy body 1 on the right, electrons whose spin is aligned in the magnetization direction of the main pole 5, and a spin torque, which tries to turn the magnetization of the magnetization rotation layer 2 in the reverse direction to the magnetization of the main pole 5, is at work. By passing an electric current in the direction indicated in FIG. 5, it is possible to effect such a configuration that a spin torque would be exerted in such a direction as to suppress the influence that the magnetic field from the main pole has on the magnetization rotation body 2. In order to attain these spin torque actions, it is necessary to pass a high-frequency excitation current from the side of the main pole 5 to the side of the opposing pole 6. The direction and magnitude of the high-frequency excitation current are controlled by having the polarity and gain of the IC amplifier 113 switched by the disk controller. Spin torque actions become greater the greater the high-frequency excitation current (electron flow) is, and also become greater by inserting approximately 1 nm of a CoFeB layer with high polarizability between the metal non-magnetic spin conduction layer 3 or the metal non-magnetic spin conduction layer 15 and its adjacent layer.

Although 2-nm-Ru was used for the metal non-magnetic spin conduction layer 15 and the metal non-magnetic spin conduction layer 3, it is also possible to use Cu, etc., which are metal non-magnets with high spin conductance.

For the second perpendicular magnetic anisotropy body 4, L11-type CoPt$_{50}$ with perpendicular magnetic anisotropy of $2.4 \times 10^6$ J/m$^3$ was used. The magnetizations of the first perpendicular magnetic anisotropy body 1 and of the second perpendicular magnetic anisotropy body 4 were such that the second perpendicular magnetic anisotropy body 4 was magnetized by first applying a strong magnetic field at a high temperature, and the first perpendicular magnetic anisotropy body 1 was magnetized by subsequently applying, in the reverse direction, a weaker magnetic field than the initial magnetic field. The initial magnetization direction of the second perpendicular magnetic anisotropy body 4 may be either the right or left direction in the diagram and does not define a current direction with which an effective spin torque can be obtained.

For the recording medium 7, recording media respectively comprising, on a substrate 19, recording layers of the structures below were created, and the properties of each were evaluated in combination with a magnetic head of the present embodiment. It is noted that these magnetic films were continuously formed in a vacuum through sputtering with varying target compositions.

(1) Recording Medium A-30/60

Lower recording layer 18: an FePt—SiOx layer with a magnetic anisotropy field of 4.8 MA/m (60 kOe) and a film thickness of 6 nm.

Upper recording layer 17: a CoCrPt—SiOx layer with a magnetic anisotropy field of 2.4 MA/m (30 kOe) and a film thickness of 5 nm.

(2) Recording Medium A-60/30

Lower recording layer 18: a CoCrPt—SiOx layer with a magnetic anisotropy field of 2.4 MA/m (30 kOe) and a film thickness of 5 nm.

Upper recording layer 17: an FePt—SiOx layer with a magnetic anisotropy field of 4.8 MA/m (60 kOe) and a film thickness of 6 nm.

(3) Recording Medium A-60/60

Single-layer recording layer (upper recording layer 17 and lower recording layer 18 are combined): an FePt—SiOx layer with a magnetic anisotropy field of 4.8 MA/m (60 kOe) and a film thickness of 11 nm.

(4) Recording Medium A-30/30

Single-layer recording layer: a CoCrPt—SiOx layer with a magnetic anisotropy field of 2.4 MA/m (30 kOe) and a film thickness of 11 nm.

While it is speculated that it would be possible to record with a high-frequency magnetic field of a lower frequency the smaller the magnetic anisotropy field of the upper recording layer 17 is, it is undesirable as switching would occur with the magnetic field of the main pole if it were too small.

Figure 6:
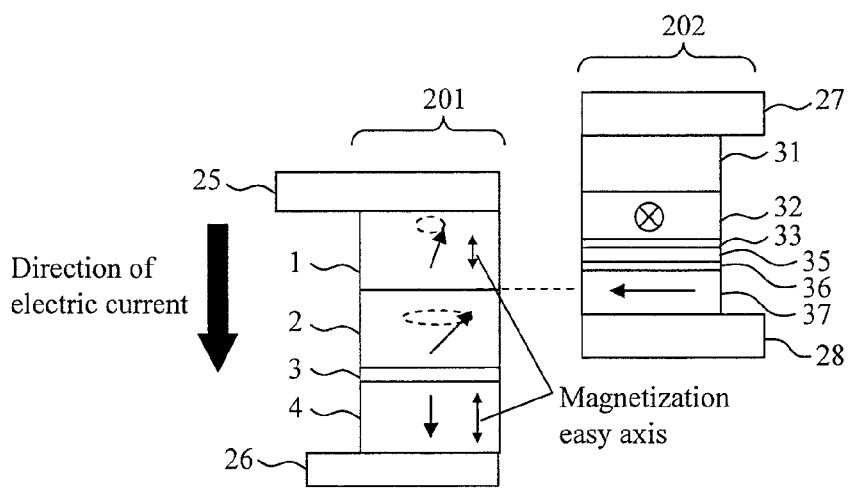
FIG. 6 is a configuration diagram for illustrating a method of evaluating the properties of the high-frequency magnetic field generated from the write head shown in FIG. 5.

FIG. 6 is a schematic view showing the main portion of an evaluation apparatus that was made in order to evaluate the properties of the high-frequency magnetic field generator used in the write head part shown in FIG. 5. It has such a structure where the main pole 5, the magnetic flux rectifying layer 8, the metal non-magnetic spin conduction layer 15 and the opposing pole 6 are removed from FIG. 5, and where a positive electrode 25 and a negative electrode 26 are added. Further, it is so arranged that an external magnetic field in the up/down direction in the diagram can be applied to the high-frequency magnetic field generator (in the diagram, the upward direction is taken to be the positive direction). An ordinary TMR device was used for detecting the generation of a high-frequency magnetic field, where it had such a structure where a negative electrode 28 was stacked after a positive electrode 27, an antiferromagnetic layer 31, a fixed layer 32, 1-nm-CoFeB (33), a 1-nm-insulation layer (MgO) 35, 1-nm-CoFeB(36), and a free layer 37. 15-nm-IrMn was used for the antiferromagnetic layer 31, 10-nm-CoFe for the fixed layer 32, and 10-nm-CoFe for the free layer 37. The antiferromagnetic layer 31 was so heat-treated that the magnetization of the fixed layer 32 would be directed into the drawing.

The magnetization of the free layer 37 was given weak anisotropy so as to face the left/right direction in the diagram, and was so installed that the interface between the magnetization rotation body layer 2 and the first perpendicular magnetic anisotropy body 1 or the metal non-magnetic spin conduction layer 3 would fall on an extension of this magnetization. By employing this arrangement, the high-frequency magnetic field component that is perpendicularly incident on the plane of the free layer 37 increases, and it is possible to thus enhance sensitivity in the high-frequency domain. This results from an effect whereby the magnetization of the free layer 37 that has a magnetic moment moves in a perpendicular direction to the magnetic field in short periods lasting a nanosecond or less.

Figure 7:
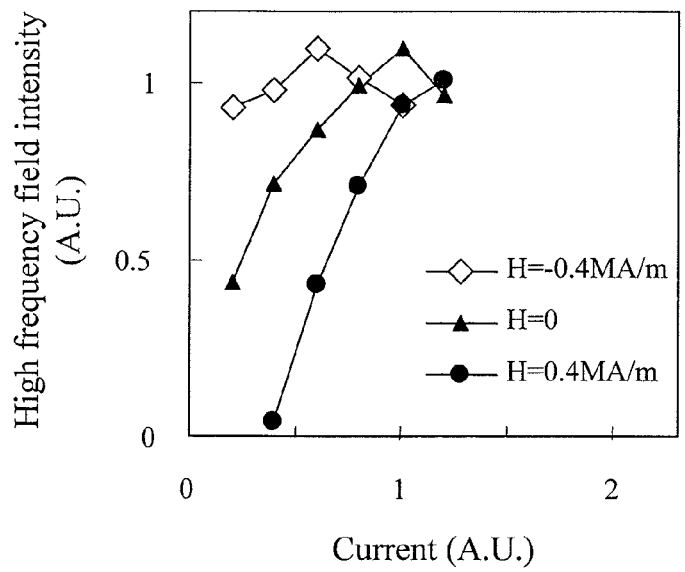
FIG. 7 is a diagram showing the high-frequency excitation current dependence of the high-frequency field intensity generated by the magnetic head in FIG. 5.
Figure 8:
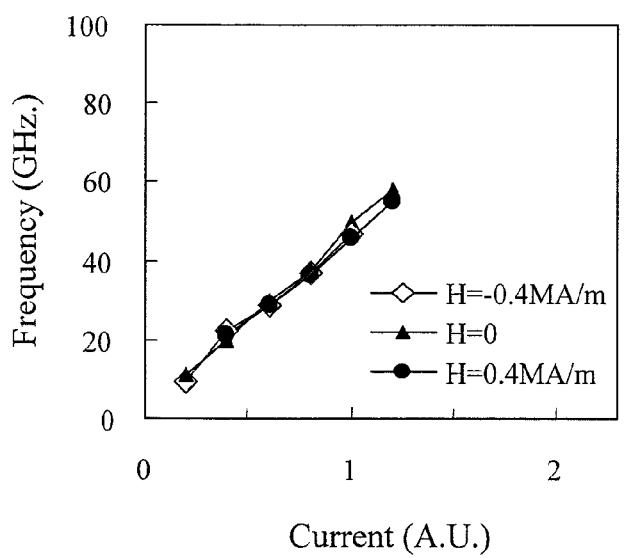
FIG. 8 is a diagram showing the high-frequency excitation current dependence of the high frequency generated by the magnetic head in FIG. 5.

Evaluation results are shown in FIG. 7 and FIG. 8. FIG. 7 shows the high-frequency excitation current dependence of the high-frequency field intensity generated by the high-frequency magnetic field generator shown in FIG. 6. When the external magnetic field is −0.4 MA/m (a downward magnetic field in the diagram), the high-frequency field intensity is greater as compared to the other cases, but once the high-frequency excitation current exceeds one unit, oscillation becomes unstable. When there is no external magnetic field, the high-frequency field intensity increases as the high-frequency excitation current increases, decreases once the high-frequency excitation current exceeds one unit, and oscillation becomes unstable at still greater high-frequency excitation currents. When the external magnetic field is 0.4 MA/m (an upward magnetic field in the diagram), no high-frequency magnetic field is outputted until the high-frequency excitation current reaches a certain level. Once a high-frequency magnetic field is generated, the high-frequency field intensity increases rapidly as the high-frequency excitation current increases, but oscillation becomes unstable before reaching the maximum levels in the other cases. These phenomena may be readily understood by means of the direction of the vector sum of the downward spin torque injected from the second perpendicular magnetic anisotropy body 4, the external magnetic field, and the exchange coupling field from the first perpendicular magnetic anisotropy body 1. The high-frequency field intensity assumes the greatest value when the vector sum is zero, and the magnetization of the magnetization rotation body layer 2 at this point rotates within the layer.

FIG. 8 shows the high-frequency excitation current dependence of the frequency of the high-frequency magnetic field generated by the high-frequency magnetic field generator shown in FIG. 6. It can be seen that frequency is independent of the external magnetic field and is dependent only on the high-frequency excitation current. Since oscillation is unstable when the high-frequency excitation current is strong, it never exceeded 60 GHz even at its highest level. It is speculated that this is due to the fact that when the magnetization rotation plane of the magnetization rotation body layer 2 comes to be in the opposite direction to the magnetization of the first perpendicular magnetic anisotropy body 1, distortion within the first perpendicular magnetic anisotropy body 1 becomes too large, and it becomes impossible to sufficiently transfer the exchange coupling field.

From the results above, it is understood that when using the high-frequency magnetic field generator shown in FIG. 5, since the high-frequency excitation current value at which maximum high-frequency output is reached varies depending on the polarity of the main pole, if one were to vary the high-frequency excitation current in an attempt to attain maximum high-frequency output, there is a possibility that the high frequency may change and that magnetic resonance of the medium may not be attained. Therefore, there is no choice but to oscillate at, as a high-frequency excitation current value with which the high frequency and the high-frequency output do not vary depending on the polarity of the main pole, an average value of the optimal high-frequency excitation current value determined by the polarity of the main pole. In this case, the high-frequency output is 90% or less of the maximum output.

With the configuration in FIG. 5, magnetic recording was performed using a spinstand, and with a head-medium relative speed of 20 m/s, a head-medium spacing of 5 nm, and a track pitch of 20 nm. Further, this was read with a GMR head with a shield gap of 20 nm. When the signal/noise ratio at 1,000 kFCI was measured while altering the oscillation frequency by varying the high-frequency excitation current, up to 12.0 dB was attained with recording medium A-30/60, and it was found that recording/reading at a recording density just exceeding 2 Tbits per square inch had been attained. The high frequency in this case was 51 GHz. When recording was performed with a greater or lesser high-frequency excitation current than the high-frequency excitation current value at which maximum signal/noise ratio is obtained, the read signal became asymmetrical between the positive side and the negative side of the average value of the signal. It is speculated that this is due to the fact the high-frequency field intensity varies depending on differences in the polarity of the main pole as shown in FIG. 7. The aforementioned asymmetry became smaller when there was used a high-frequency magnetic field generator 201 in which 1 nm of CoFeB layers with high polarizability were respectively inserted between the metal non-magnetic spin conduction layer 15 and the adjacent magnetic flux rectifying layer 8 and first perpendicular magnetic anisotropy body 1 layer. It is speculated that this is due to the fact that the spin torque mediated by the metal non-magnetic spin conduction layer 15 was reinforced, and the action of reducing the influence of the fringing field from the main pole 5 became larger. With respect to recording medium A-30/60, when ones in which the magnetic anisotropy field of the upper recording layer 17 was respectively changed to 2.0 MA/m and 2.8 MA/m were used, the maximum values of the signal/noise ratio respectively became 11.0 dB and 10.0 dB, and recording/reading at a recording density exceeding 2 Tbits per square inch was not attained. It is speculated that this is due to the fact that favorable recording (switching) is not attained because the high frequency deviates from the optimal value for writing.

With the write head part 200 produced with the present configuration example, as the asymmetry of the read signal becomes pronounced when the high frequency deviates from 51 GHz, it becomes possible to attain an even higher recording density by fixing the magnetic anisotropy field of the upper recording layer 17 of the recording medium 7 that is used in combination at approximately 2.4 MA/m and increasing the magnetic anisotropy of the lower recording layer 18. When recording media A-30/30, A-60/60, and A-60/30 were used, up to 13.0 dB, 4.0 dB, and 8.1 dB were respectively attained. While recording medium A-30/30 has no problems in terms of recording/reading properties, the magnetic field sweep rate dependence of the magnetization curve is high, and there is a possibility that the recorded magnetization may experience thermal degradation. With recording medium A-60/60, writing was not carried out sufficiently. It is speculated that the magnetic field from the main pole, the high-frequency field intensity and the frequency did not reach resonant conditions. With recording medium A-60/30, the magnetic anisotropy of the lower recording layer 18 is smaller than the magnetic anisotropy of the upper recording layer 17, and it is speculated that a sufficient magnetic field did not reach the lower recording layer 18 that is far from the main pole 5 and the magnetization rotation body layer 2.

Thus, when a magnetic head of the present embodiment is used in such a manner that the recording medium used in combination therewith has two or more recording layers and that the magnetic anisotropy field of the magnetic layer on the upper side has a magnetic resonance frequency that matches the optimal oscillation conditions of the write head part 200, the asymmetry of the read signal does not become pronounced, and it is possible to increase recording density.

Figure 9:
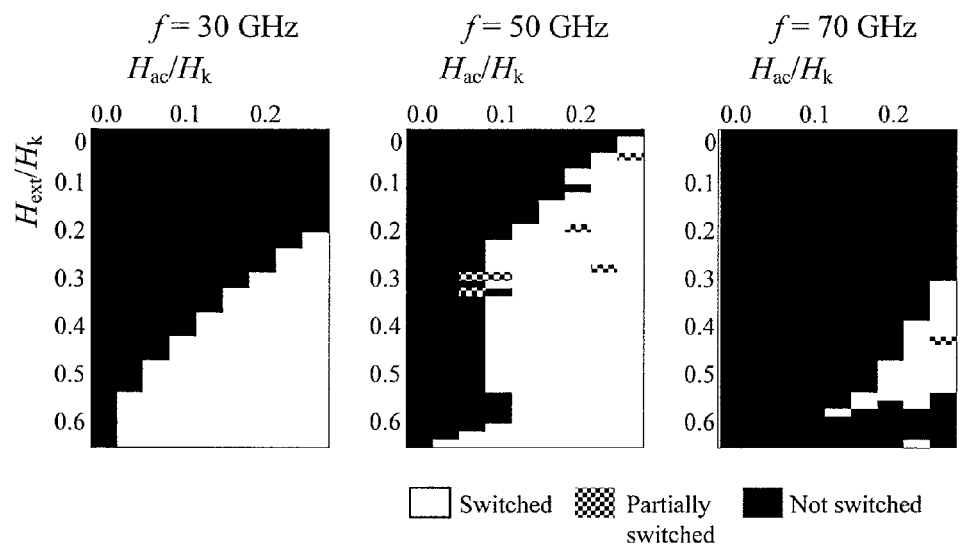
FIG. 9 is a diagram showing the results of examining the status of switching with respect to cases where the high frequency was offset from the optimal value.

FIG. 9 shows, with respect to a medium where $H_k$=2.4 MA/m (30 kOe), the results of computer simulations in which switching states were examined while varying $H_{ac}$ and $H_{ext}$. Calculations were performed while changing the frequency of the microwave magnetic field to be used as an assisting magnetic field to 30 GHz and 70 GHz on both sides of the optimal value (f=50 GHz). Assisting effects were greatest when the high frequency was at the optimal value, indicating that when the high-frequency field intensity is less than 10% of $H_k$, magnetization switching does not occur even if external magnetic field $H_{ext}$ is large. When the high frequency was lower than the optimal value, assisting effects were small, and the critical properties with respect to the high-frequency field intensity that had been observed at the optimal value were absent as well. However, it was found that the switching time at the switching region was stable at 0.3 to 0.8 ns even when writing conditions were varied. This fact indicates a possibility that recording with little residual writing or cross-track writing may be possible by slightly lowering the high frequency from the optimal value, albeit at the expense of assisting effects to some extent. On the contrary, when the high frequency was greater than the optimal value, assisting effects decreased significantly.

Figure 10:
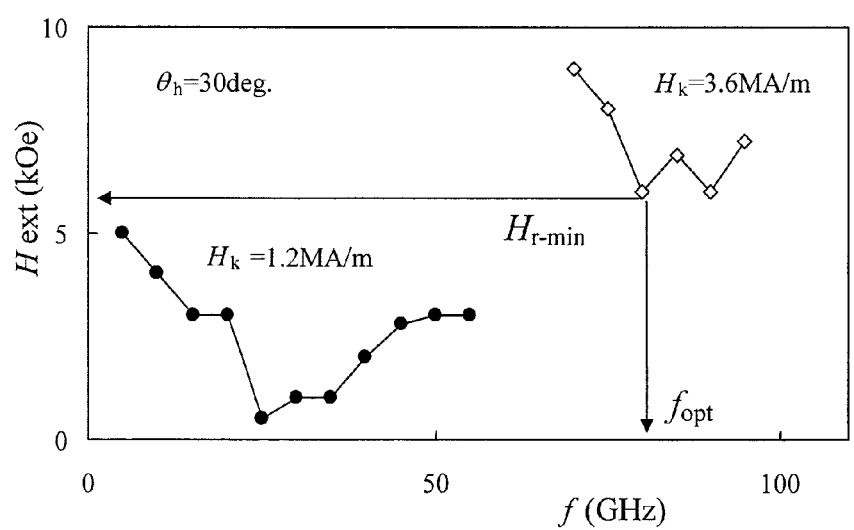
FIG. 10 is a diagram showing the high-frequency dependence of the requisite external magnetic field intensity for magnetization switching with respect to media with differing $H_k$.

FIG. 10 shows, with respect to media whose $H_k$ were 2.4 MA/m (30 kOe) and 3.6 MA/m (45 kOe) (where the medium saturation magnetization was 1.1 T), respectively, the high-frequency dependence of the requisite external magnetic field $H_{ext}$ for magnetization switching. For the requisite external magnetic field, there exists an optimal frequency $f_{opt}$ at which it assumes the smallest value, and it increases gently as the frequency deviates from the optimal value.

Figure 11:
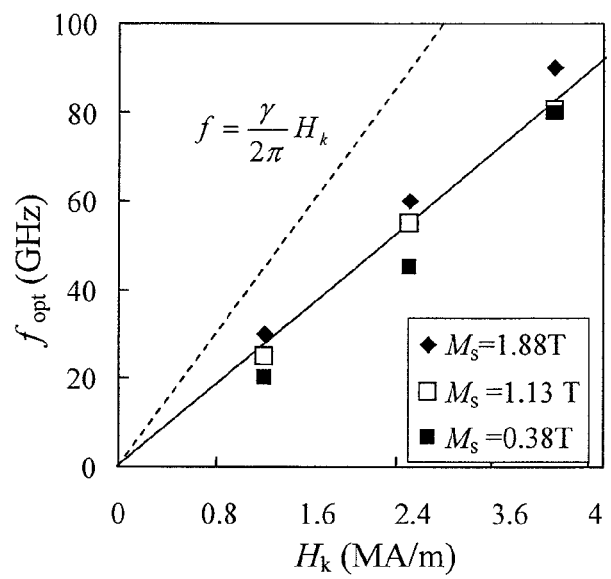
FIG. 11 is a diagram showing the magnetic anisotropy field $H_k$ dependence of optimal frequency $f_{opt}$.

FIG. 11 shows, with respect to those whose medium saturation magnetizations are 0.38 T (300 emu/cc), 1.1 T (900 emu/cc), and 1.9 T (1,500 emu/cc), respectively, the $H_k$ dependence of $f_{opt}$ (where $\theta_h$=30 degs.). $f_{opt}$ is generally proportional to $H_k$. However, its value is approximately 70% of the magnetic resonance oscillation frequency at external magnetic field $H=H_k$ as represented by $$f=\gamma H_k/2\pi \quad \text{[Equation 3]}$$

This corresponds to the fact that where $\theta_m$ represents the angle formed between magnetization and the magnetization easy axis, the magnitude of the magnetic anisotropy field varies by $H_k \cos \theta_m$. Specifically, it suggests that the assisting energy due to magnetic resonance is mainly supplied when the magnetization has moved away from the magnetization easy axis direction to a certain extent. Although no significant change is observed when the saturation magnetization of magnetic particles changes, a slightly higher frequency is required when the saturation magnetization is greater. It is speculated that this is because magnetization stabilizes under the influence of the static magnetic field.

Figure 12:
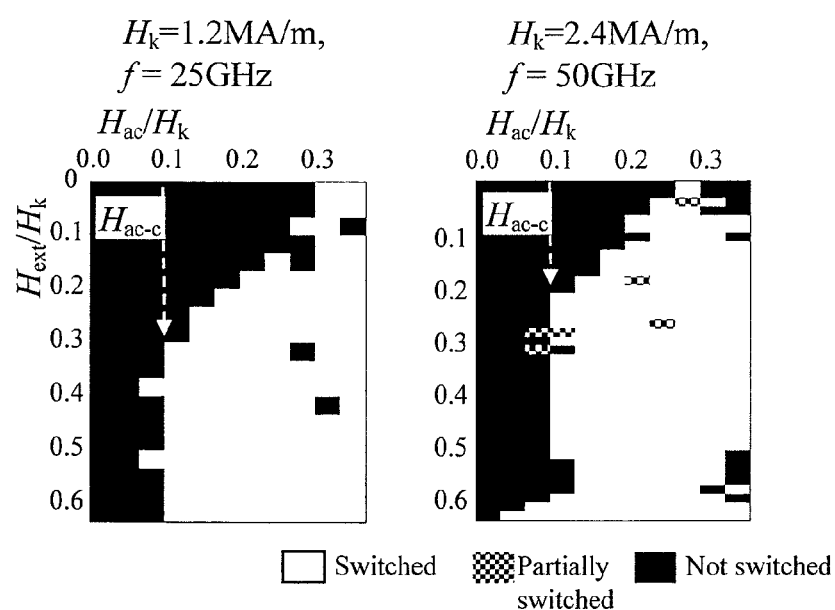
FIG. 12 is a diagram showing the results of examining magnetization switching behavior with respect to media with differing $H_k$ while varying $H_{ac}$ and $H_{ext}$.

FIG. 12 shows, with respect to media with differing $H_k$, the results of examining switching states while varying $H_{ac}$ and $H_{ext}$ at optimal frequency. In both media, there was hardly any magnetization switching when the normalized high-frequency field intensity $H_{ac}/H_k$ was smaller than 0.1, and no assisting effects (i.e., a reduction of $H_{ext}$, at which magnetization switching occurs, from the Stoner-Wohlfarth magnetic field) were observed. Once $H_{ac}/H_k$ exceeded 0.1, assisting effects were observed, and switching was possible at an external magnetic field of approximately 30% of $H_k$. As the high-frequency field intensity becomes greater, the requisite external magnetic field intensity becomes even smaller, and the external magnetic field becomes unnecessary when $H_{ac}/H_k$ is approximately 0.3. However, once $H_{ac}/H_k$ exceeds 0.3, since magnetization fluctuates widely with the high-frequency magnetic field, a magnetization backswitching phenomenon, etc., would occur, making stable writing (switching) unattainable.

Thus, by using as the magnetic recording medium a recording medium of such a structure where a plurality of magnetic layers with varying magnetic anisotropy fields are stacked, and by adjusting the oscillation frequency of the ac magnetic field generated from the magnetic head to the maximum efficiency region in accordance with the magnetic layer of the recording medium with the weaker magnetic anisotropy field, it becomes possible to attain recording with less energy consumption.

It is noted that it can be seen from FIG. 12 that, at the optimal frequency, the requisite high-frequency field intensity for switching is independent of the external magnetic field intensity and is constant. It thus suggests the possibility that, in the actual recording process, a sharper magnetization switching boundary may be formed on the medium when the high-frequency field intensity varies greatly at the time of exiting a switchable state; specifically, a case where the high-frequency field intensity first becomes greater, the magnetic field from the main pole subsequently becomes greater and recording is performed, and the high-frequency field intensity decays immediately thereafter. This indicates that it is more preferable to move the head in the reverse direction to the direction of head running in the embodiment shown using FIG. 1, or to horizontally invert the structure in FIG. 1B. This will be verified in Embodiment 2.

Embodiment 2

In the present embodiment, there will be described an information recording apparatus of such a structure where the direction of magnetic head running (the direction of travel relative to the recording medium) is the reverse of that of the magnetic head described in Embodiment 1.

Figure 13:
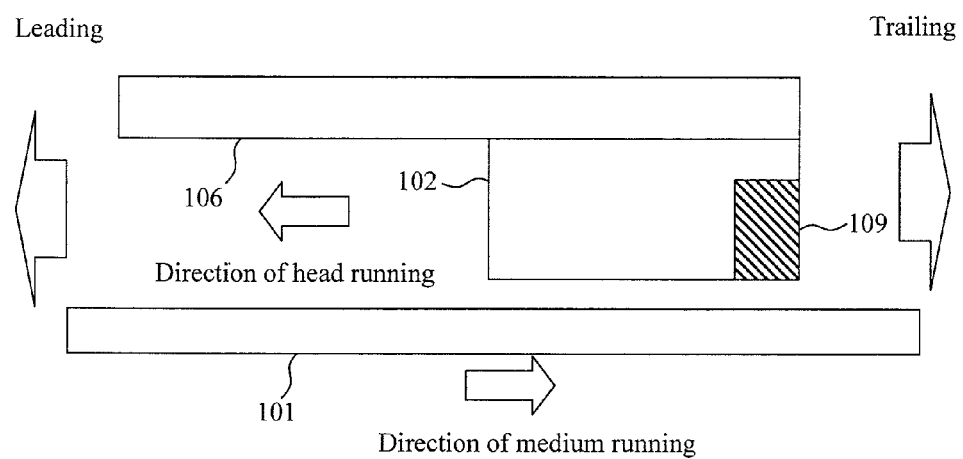
FIG. 13 is a view showing configuration examples of a magnetic head slider and a magnetic head of Embodiment 2.
Figure 13:
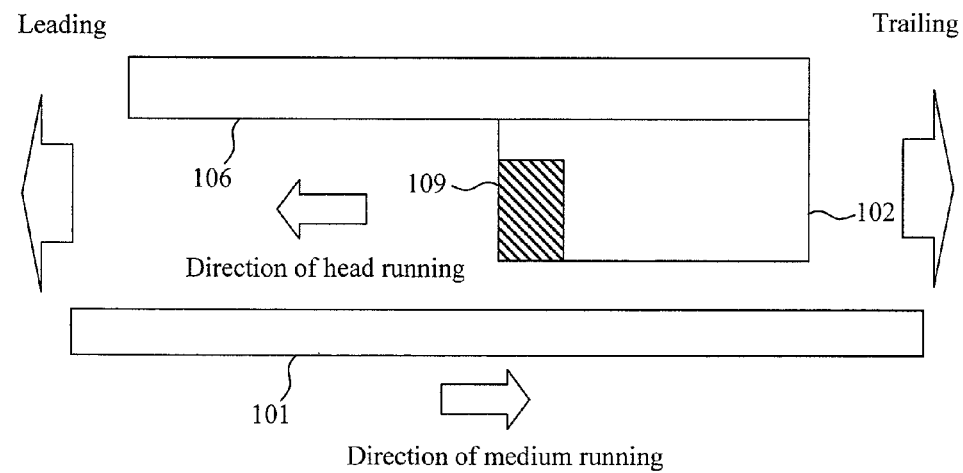
Figure 14:
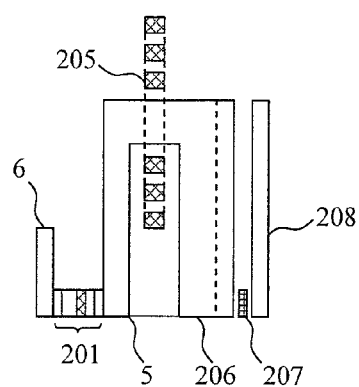
FIG. 14 is an overall configuration diagram of a magnetic head of Embodiment 2.
Figure 14:
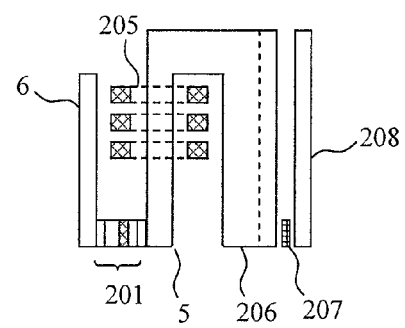
Figure 14:
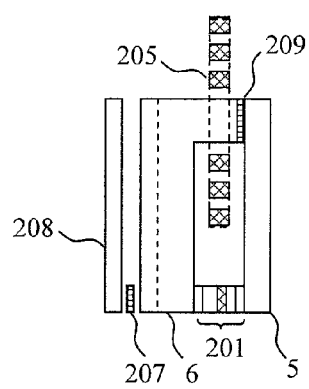
Figure 14:
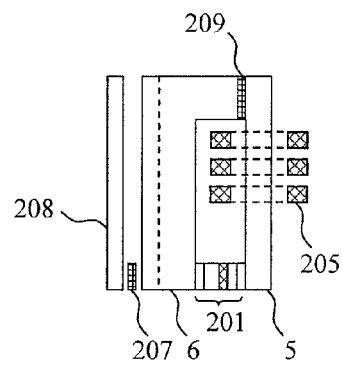
Figure 14:
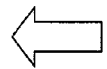

First, the positional relationship between the direction of magnetic head running and the recording medium will be described with reference to FIGS. 13(A) and (B). There are two kinds of modes for mounting a magnetic head on a magnetic head slider, where one is to dispose it on the trailing side as shown in FIG. 13(A), and the other is to dispose it on the leading side as shown in FIG. 13(B). Here, the trailing side and the leading side are determined by the direction of travel of the magnetic head slider relative to the recording medium. If the direction of recording medium running is reversed from the direction shown in FIG. 13(A) or FIG. 13(B) (the direction indicated by the arrow in the drawings), FIG. 13(A) would then show mounting on the leading side, and FIG. 13(B) mounting on the trailing side. It is noted that while it is possible, in principle, to reverse the trailing side and leading side relationship by rotating the recording medium in the reverse direction through a reversal of the polarity of the spindle motor, it would be unrealistic to change the polarity of the spindle motor given the need to accurately control frequency of rotation.

Next, configuration examples of magnetic heads which allow for a reversal of the direction of magnetic head running in relation to Embodiment 1 are shown in FIGS. 14(A) through (D). With respect to FIG. 14, the trailing side and the leading side are defined as being a direction that points from the right side of the sheet to the left as indicated in FIGS. 13(A) and (B).

In FIG. 14(A), there is shown a configuration example of a microwave assisted magnetic recording head where the read head part is disposed on the trailing side and the write head part on the leading side. As the elements corresponding to the respective reference numerals are also found in FIG. 1B, descriptions will be omitted. However, with respect to the configuration shown in FIG. 14(A), the opposing pole 6 is formed at the leading-side end part, and the main pole 5 is formed more towards the trailing side than is the opposing pole. Thus, the stacking order of the high-frequency generator 201 formed between the main pole 5 and the opposing pole 6 is, when viewed from the upper side of the sheet, in reverse to the stacking order shown in FIG. 5.

FIG. 14(B) shows another configuration example of a magnetic head of the present embodiment. In the magnetic head shown in FIG. 14(B), the excitation coil of the main pole 5 is wound laterally instead of upward. In the case of a magnetic head of the present configuration, since the excitation position is closer to the air bearing surface of the main pole as compared to the structure in FIG. 14(A), it is possible to generate from the main pole 5 a stronger magnetic flux as compared to FIG. 14(A).

FIG. 14(C) shows a configuration example of a microwave assisted magnetic recording head where the write head part is disposed on the trailing side and the read head part on the leading side. With respect to a magnetic head of the configuration shown in FIG. 14(C), the main pole 5 is disposed at the end part farthermost on the trailing side, and the opposing pole 6 is disposed on the leading side relative to the main pole 5. In the case of a magnetic head of the structure shown in FIG. 14(C), a read sensor shield is shared with the opposing pole 6, but they may also be separated. As in FIG. 14(A), the stacking order of the high-frequency generator 201 is in reverse to the stacking order shown in FIG. 5. Although the winding direction of the excitation coil is upward as in FIG. 14(A), it may also be wound laterally as shown in FIG. 14(D). It is noted that write head parts of the configurations shown in FIGS. 14(A) through (D) are mountable on magnetic head sliders of both structures shown in FIGS. 13(A) and (B). With respect to FIGS. 14(C) and (D), since the opposing pole doubles as an auxiliary pole, an electrically insulating film 209 is formed between itself and the main pole 5 in order to pass a high-frequency excitation current through the high-frequency magnetic field generator 201.

Figure 15:
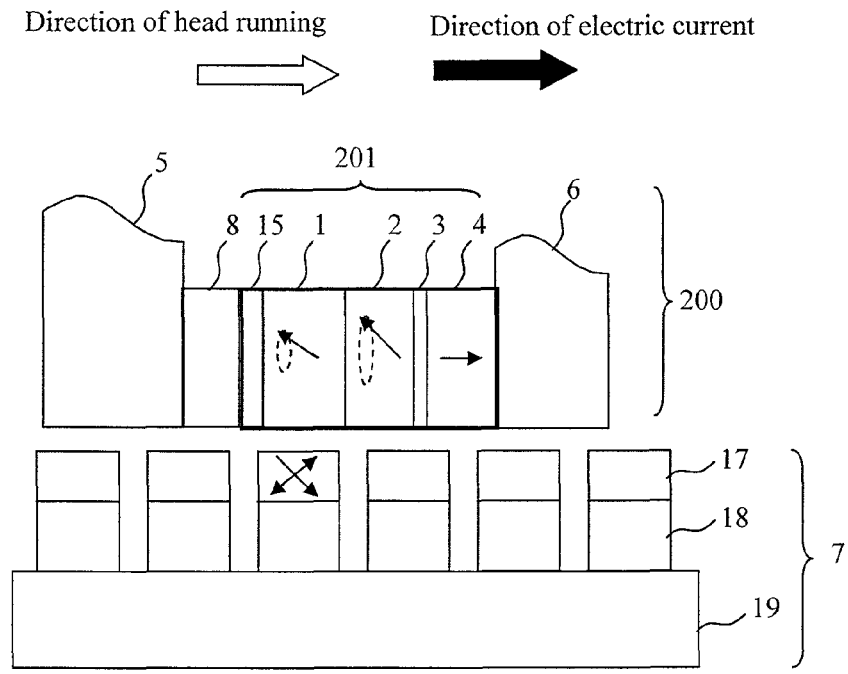
FIG. 15 is a configuration diagram (sectional view) of a write head part of Embodiment 2.

A configuration example of a write head part of an information processing apparatus of the present embodiment is shown in FIG. 15. While the configuration of the write head part shown in FIG. 15 is the same as the configuration in FIG. 5, the direction of head running is changed so as to be from left to right relative to the medium. In order to facilitate comparison with the configuration example in FIG. 5, the positions of the main pole 5 and the opposing pole 6 in FIG. 15 are shown in alignment with those in FIG. 5. In other words, the configuration of the write head part shown in the present diagram is equivalent to the configuration of the magnetic heads shown in FIGS. 14(A) through (D) as seen from the back side of the sheet. It is noted that since the configuration per se of the write head part is the same as in Embodiment 1, a description of the details will be omitted.

In addition, for purposes of reducing the fringing field to the magnetization rotation body layer 2 to increase the high frequency, the auxiliary pole provided on the side of the main pole 5 opposite the opposing pole 6 is brought slightly closer towards the main pole 5.

For the recording medium 7, a so-called patterned medium was used. After forming a continuous film on the substrate 19 by sputtering, a magnetic body pattern whose length in the track direction is 15 nm and 9 nm in the down-track direction was formed through electron beam recording. Then, the continuous film was etched to form the above-mentioned magnetic body pattern in such a manner as to be disposed with a pitch of 20 nm in the track width direction and a pitch of 12.5 nm in the track circumferential direction.

In addition, for the magnetic layers forming the magnetic body pattern, there was employed the structure indicated below where two layers of a magnetic body, namely an upper layer and a lower layer, were stacked. A 6-nm-(Co/Pt) artificial lattice layer with a magnetic anisotropy field of 2.8 MA/m (34 kOe) was used for the upper recording layer 17, and a 6-nm-FePt layer with a magnetic anisotropy field of 4.8 MA/m (60 kOe) was used for the lower recording layer 18. According to measurements of absorption line width by way of ferromagnetic resonance, the damping factors $\alpha$ of the upper recording layer 17 and the lower recording layer 18 were 0.20 and 0.02, respectively. When a Pt- or Pd-rich region comes into contact with a magnetic body, magnetization is induced in that region and acts to damp changes in magnetization direction. Thus, damping factor $\alpha$ can be increased. For example, with a CoCrPt magnetic body having a high Pt content, damping factor $\alpha$ is large even without the use of an artificial lattice structure.

The recording medium above was set on a spinstand, magnetic recording was carried out at a head-medium relative speed of 20 m/s, a head-medium spacing of 5 nm, and a track pitch of 20 nm, and, further, this was read by means of a GMR head with a shield gap of 20 nm. The recording medium thus created was combined with the magnetic head in FIG. 15, and recording/reading properties were measured. Measurements were taken while varying the oscillation frequency by varying the intensity of the current supplied between the main pole and the opposing pole, and while having the recording pattern be 1,000 kFCI. As a result, a signal/noise ratio of up to 15 dB was attained, and it was found that recording/reading at a recording density exceeding 2 Tbits per square inch was well attainable. The frequency of the high-frequency magnetic field at which the signal/noise ratio became 15 dB was 28 GHz. In the case of a configuration in which the direction of head running was from right to left, it was up to 13.5 dB. For purposes of comparison, properties were evaluated using recording medium A-30/60, which was used in Embodiment 1, but the signal/noise ratio in that case was 13 dB at most. Using a recording medium in which the damping factor of the upper recording layer is greater results in faster magnetization switching speeds and improved recording/reading properties.

With respect to the combination of the recording medium and the magnetic head indicated in the present embodiment, no significant correlation was observed between recording/reading properties and the recording medium's frequency of rotation. For example, no significant degradation in recording/reading properties was observed even with a head-medium relative speed of 40 m/s. However, when a magnetic layer with a small damping factor, namely 0.05 (using a 6-nm-CoCrPt layer with a magnetic anisotropy field of 2.8 MA/m (34 kOe)), was used for the upper recording layer 17, there was observed a tendency for the signal/noise ratio to be dependent on the head-medium relative speed (the S/N ratio dropped by 4 dB at a head-medium relative speed of 40 m/s as compared to the case of 20 m/s). To find out the reason for this, further consideration was given using simulation.

Figure 16:
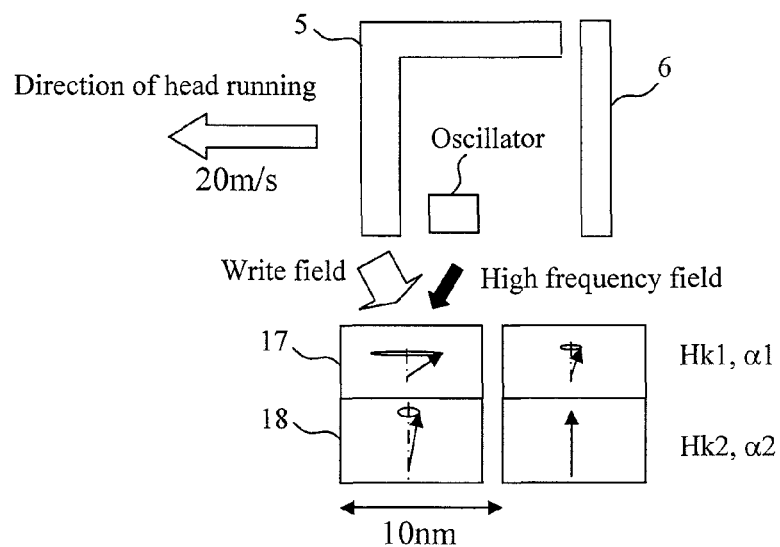
FIG. 16 is a schematic view of a simulated model used in Embodiment 2.

FIG. 16 is an overview of the model that was used in the present simulation. The main pole 5 is disposed on the leading side and the opposing pole 6 on the trailing side, and an ac magnetic field generator is disposed therebetween. The upper recording layer 17 and the lower recording layer 18, with magnetic anisotropy fields and damping factors of $H_{k1}$, $\alpha_1$, and $H_{k2}$, $\alpha_2$, respectively, are stacked right below the write head part. A switching magnetic field (write magnetic field) for switching the magnetization of the recording layer leaks from the main pole 5 to the medium, and a high-frequency magnetic field leaks from the ac magnetic field generator to the medium.

Figure 17:
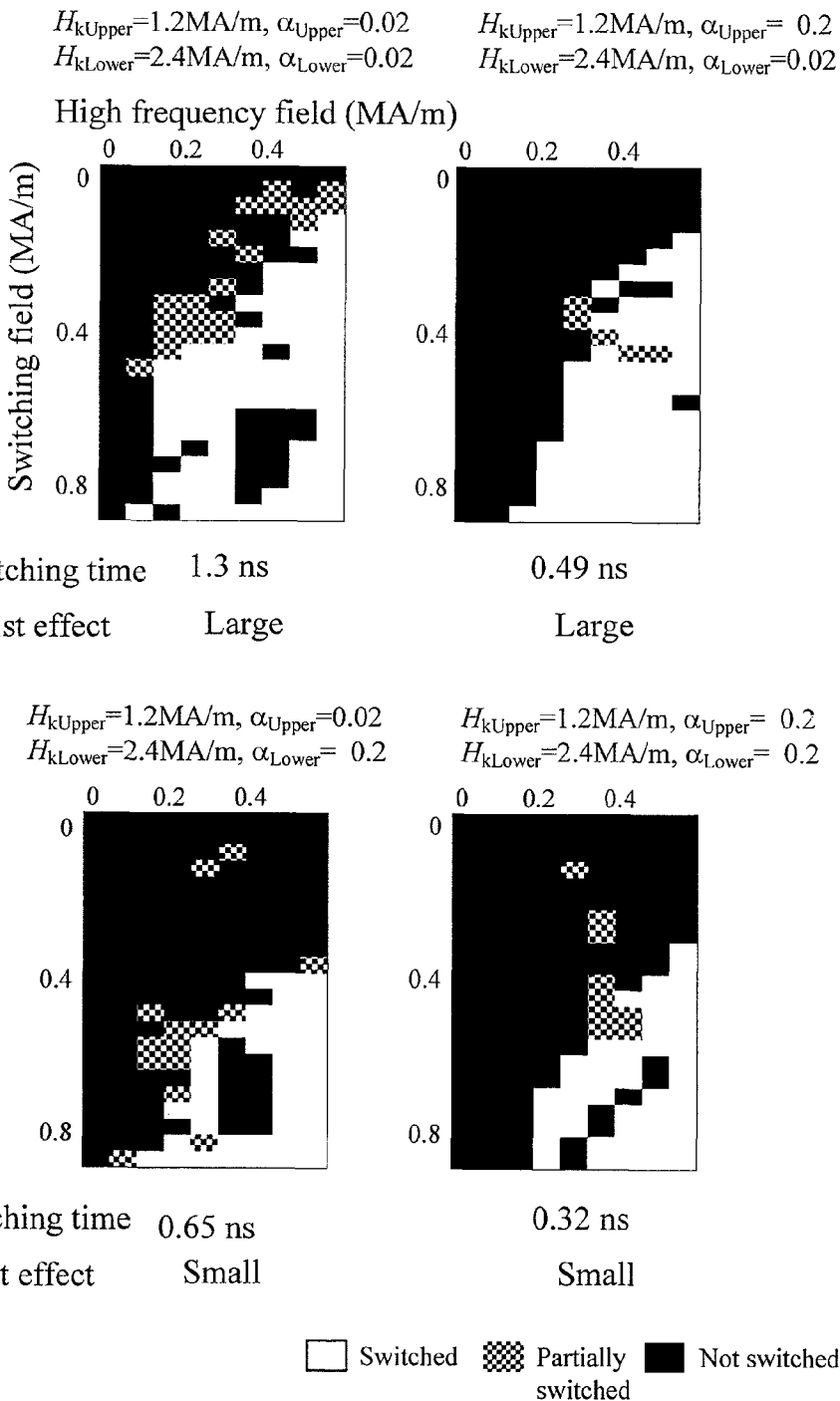
FIG. 17 is a diagram showing computer simulation results where magnetization switching behavior was studied with respect to combinations of an upper recording layer and a lower recording layer with varying damping factors α.

Using the simulated model in FIG. 16 and with respect to the following four cases regarding the magnetic anisotropy fields and damping factors of the upper magnetic layer and the lower magnetic layer, FIG. 17 maps how the magnetization switching intensity of the upper and lower magnetic layers as a whole varies in dependence upon the high-frequency field intensity. It is noted that the oscillation frequency of the high-frequency magnetic field was fixed at 25 GHz. The time it took for magnetization switching (switching time) is also provided below each diagram. The switching time was defined as being the time it took for 95% or more of the magnetization to switch from when the high-frequency magnetic field was applied.

(1) Medium 1
Upper recording layer: $H_k$=1.2 MA/m (15 kOe), damping factor ($\alpha_{upper}$)=0.02
Lower recording layer: $H_k$=2.4 MA/m (30 kOe), damping factor ($\alpha_{lower}$)=0.02
(2) Medium 2
Upper recording layer: $H_k$=1.2 MA/m (15 kOe), damping factor ($\alpha_{upper}$)=0.2
Lower recording layer: $H_k$=2.4 MA/m (30 kOe), damping factor ($\alpha_{lower}$)=0.02
(3) Medium 3
Upper recording layer: $H_k$=1.2 MA/m (15 kOe), damping factor ($\alpha_{upper}$)=0.02
Lower recording layer: $H_k$=2.4 MA/m (30 kOe), damping factor ($\alpha_{lower}$)=0.2
(4) Medium 4
Upper recording layer: $H_k$=1.2 MA/m (15 kOe), damping factor ($\alpha_{upper}$)=0.2
Lower recording layer: $H_k$=2.4 MA/m (30 kOe), damping factor ($\alpha_{lower}$)=0.2

According to FIG. 17, when ($\alpha_{upper}$, $\alpha_{lower}$) are (0.2, 0.2), the switching time is shortest at 0.32 ns, but the requisite external magnetic field is large and the assisting effect small. When ($\alpha_{upper}$, $\alpha_{lower}$) are (0.02, 0.02), the requisite external magnetic field is small and the assisting effect large, but the switching time is longest at 1.3 ns and is not suited for high-speed writing. When ($\alpha_{upper}$, $\alpha_{lower}$) are (0.2, 0.02), the requisite external magnetic field is small and the assisting effect large, on top of which the switching time is short at 0.49 ns, and microwave assisted magnetic recording that allows for high-speed writing is attained. It is speculated that, since magnetization switches rapidly when damping factor α is large, the magnetization of the upper recording layer 17 switches rapidly with a weak magnetic field when α of the upper recording layer 17 is large, and that, being dragged thereby, the magnetization of the lower recording layer 18 switches.

Figure 18:
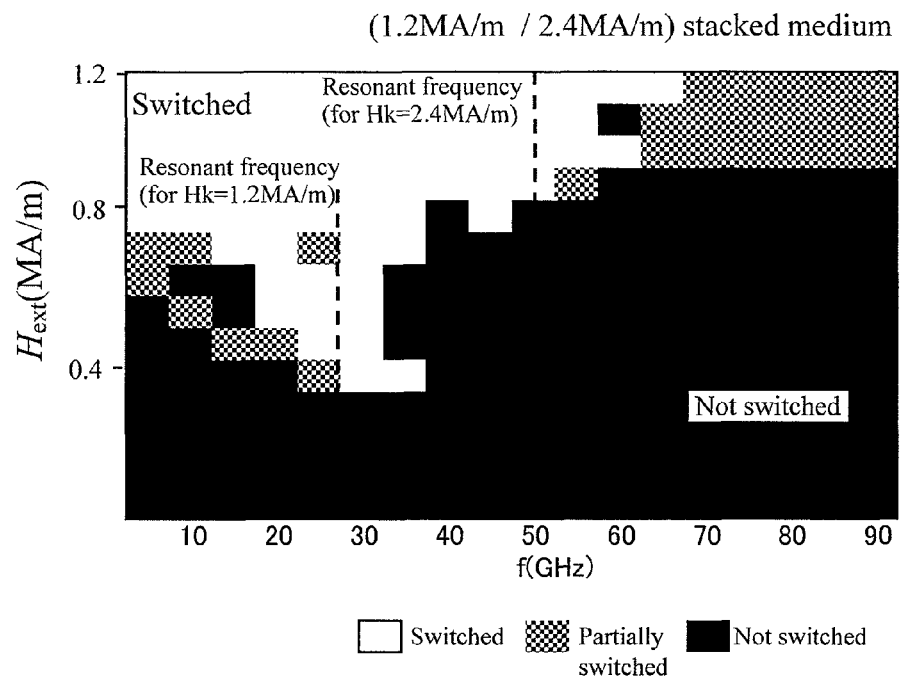
FIG. 18 is a diagram showing the results of a simulation used in Embodiment 2.

FIG. 18 shows the results of examining switching state with respect to high frequency and external magnetic field intensity, where the high-frequency field intensity is 0.4 MA/m, and ($\alpha_{upper}$, $\alpha_{lower}$) are (0.2, 0.02). It can be seen that the large required external magnetic field for switching drops at the optimal high frequency of the upper recording layer 17. It is speculated that when the magnetic anisotropy field of the upper recording layer 17 is weaker, recording is possible with a high-frequency magnetic field and an external magnetic field of lower frequencies, and at least a magnetic anisotropy field that exceeds one-half of the magnetic field that the main pole 5 creates in the recording layer center is required. It is speculated that the time it takes for magnetization switching becomes shorter due to the fact that when the magnetic anisotropy of the upper recording layer 17 is appropriately small, thermal fluctuations in the magnetization of the upper recording layer 17 increases, and the probability of attaining assisting conditions increases.

The information processing apparatus of the present embodiment has the following two advantages over Embodiment 1. (1) With respect to the recording medium, the high-frequency field intensity first becomes greater, the magnetic field from the main pole subsequently becomes greater and recording is performed, and the high-frequency field intensity decays immediately thereafter. Thus, the recording boundary becomes sharper, and favorable magnetic domains are formed. (2) The recording medium is patterned, and recording density can thus be increased.

Embodiment 3

In the present embodiment, a description will be provided with respect to configuration examples of a magnetic head in which a negative perpendicular magnetic anisotropy body is used as a rotation guide layer included in a high-frequency magnetic field generator, and of an information recording apparatus equipped with this magnetic head. By using for the rotation guide layer a magnetic body having negative perpendicular magnetic anisotropy, the magnetization of the magnetization rotation body layer is induced in the film plane. Consequently, it becomes possible to set the drive current of the high-frequency magnetic field generator in accordance with a desired frequency, in addition to which rotation of the magnetization of the magnetization rotation layer stabilizes, and resistance improves against a pinning magnetic field component that leaks or is applied from outside of the main pole, etc., into the plane of rotation. With respect to an information processing apparatus of the present embodiment, it is assumed that the relationship between the magnetic head slider and the suspension is similar to that in FIG. 1A, the configuration of the magnetic head as a whole, including the write head part and the read head part, is similar to that in FIG. 1B, and that the overall configuration of the information processing apparatus is the same as the configuration shown in FIGS. 4(A) and (B). Specifically, it is assumed that, in terms of the basic configuration of the magnetic head, the opposing pole is disposed at the end part farthermost on the trailing side, and that the main pole is disposed more towards the leading side than is the opposing pole.

Figure 19:
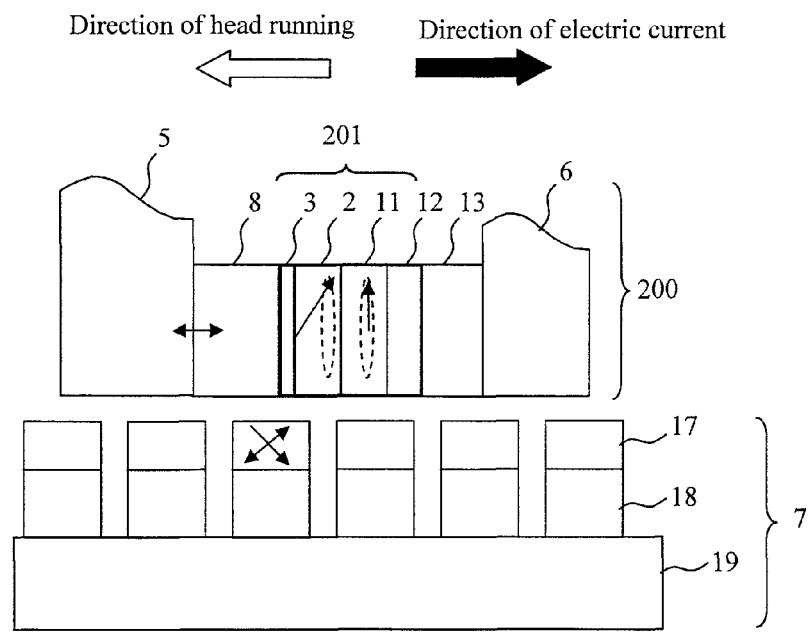
FIG. 19 is a configuration diagram (sectional view) of a write head part of Embodiment 3.

The configuration of a write head part of the present embodiment is shown in FIG. 19. The magnetic flux rectifying layer 8 is formed on the trailing side of an end part on the side of the air bearing surface of the main pole 5. The high-frequency magnetic field generator 201 is formed between the magnetic flux rectifying layer 8 and the opposing pole 6. The high-frequency magnetic field generator 201 comprises: the metal non-magnetic spin conduction layer 3; the magnetization rotation body layer 2; a negative perpendicular magnetic anisotropy body layer 11; and a metal non-magnetic spin scattering body layer 12. Further, a second magnetic flux rectifying layer 13 is formed on the leading side of an air bearing surface end part of the opposing pole 6. The metal non-magnetic spin scattering body layer 12 has the effect of scattering the spin which flows in from the second magnetic flux rectifying layer 13 to the magnetization rotation body layer 2 and which poses the risk of causing an influence whereby the effects of the spin torque flowing in from the magnetic flux rectifying layer 8 to the magnetization rotation body layer 2 are cancelled out. Alternatively, it may be said that it has the effect of preventing spin torque from flowing out to the magnetic flux rectifying layer 13 from the side of the magnetization rotation body layer 2. Thus, by using the metal non-magnetic spin scattering body layer 12, it is possible to reduce the current for obtaining the required spin torque. This effect becomes particularly strong when Ru is used for the metal non-magnetic spin scattering body layer 12. As in the present embodiment, when injecting spin torque to the magnetization rotation body layer 2 from the magnetic flux rectifying layer 8 on the side of the main pole 5 via the metal non-magnetic spin conduction layer 3, since it is possible to increase the horizontal magnetization component within the magnetic flux rectifying layer 8 by providing an extremely thin oxide layer or non-magnetic layer at the interface between the main pole 5 and the magnetic flux rectifying layer 8 to reduce exchange coupling between the magnetic bodies, the behavior of the magnetization rotation body layer 2 becomes stable.

With respect to the configuration shown in FIG. 1C, the spin rectifier 41 corresponds to the stacked structure of the metal non-magnetic spin conduction layer 3 and the magnetic flux rectifying layer 8 (lip), the rotation guide layer 43 to the negative perpendicular magnetic anisotropy body layer 11, and the magnetic flux rectifying film 48 to the magnetic flux rectifying layer 8.

It is noted that, as in Embodiment 1, the length of the high-frequency magnetic field generator 201 in the longitudinal direction is an important factor that determines the write track width, and was made to be 14 nm in the present embodiment.

Figure 20:
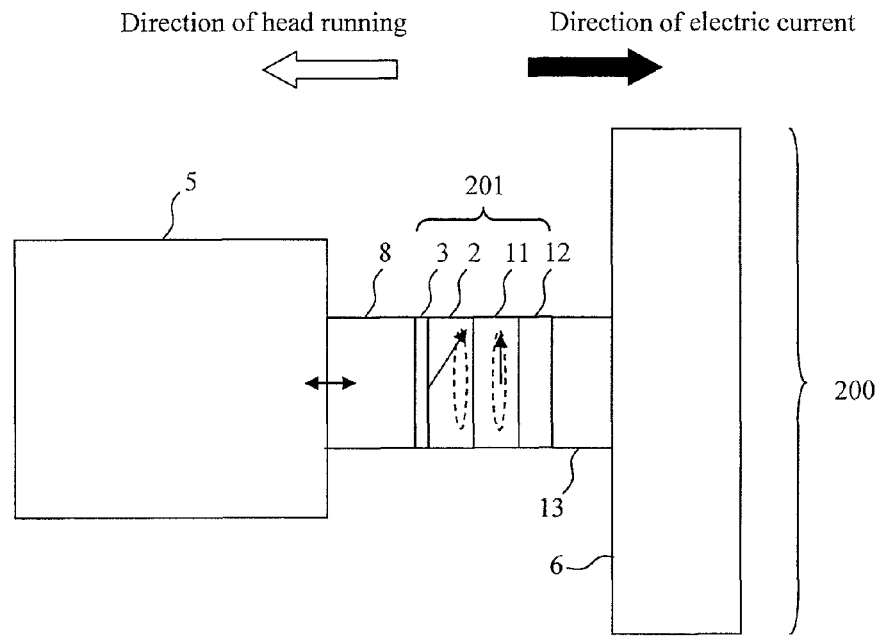
FIG. 20 is a view of the write head part in FIG. 19 as seen from the side of the air bearing surface.

Further, as in Embodiment 1, it is possible to set a slightly large width and thickness (length in the direction of head running) for the main pole 5 in order to secure a large write magnetic field, and in FIG. 20, there is shown a schematic view of the configuration of the stacked film formed between the main pole 5 and the opposing pole 6 as seen from the side of the air bearing surface. The relationship in the track width direction among the main pole 5, the opposing pole 6 and the stacked film 201 of the present embodiment is such that, as shown in FIG. 20, the width of the main pole 5 is wider than the width of the stacked film 201, and the width of the opposing pole 6 is wider than the width of the main pole 5. By adopting the present configuration, it becomes possible to form a high-resolution recorded magnetization pattern using the assisting magnetic field from the high-frequency magnetic field generator 201 that defines the track width, while at the same time strengthening the magnetic field from the main pole 5, for which it is desired that the generated magnetic field intensity be made stronger. In the present embodiment, by making the shape of the main pole 5 at the air bearing surface be 80 nm in width in the track width direction and 100 nm in thickness in the direction of head running, a write magnetic field of approximately 0.9 MA/m was obtained. While the magnetic field intensity from the main pole becomes greater when the width and thickness above are increased, the magnetic field gradient becomes smaller. Therefore, in conventional magnetic recording, resolution was improved by reducing width and thickness instead.

A material with equal or greater saturation magnetization as or than the main pole 5 was used for the magnetic flux rectifying layer 8, and thickness design for the magnetic flux rectifying layer 8 was performed using a 3D field simulator in such a manner that the magnetic field from the main pole 5 would be perpendicular to the layer direction of the magnetization rotation body layer 2. The thickness of the magnetic flux rectifying layer 8 in the present embodiment was 10 nm. However, this value is dependent on the shape of the rectangle mentioned above, the distance and state to the opposing pole, the state of the medium used, and the state of the magnetic circuit in the upper portion of the diagram. It is noted that a CoFe alloy with a film thickness of 15 nm was used for the second magnetic flux rectifying layer 13.

As in Embodiment 1, a CoFe alloy with a thickness of 20 nm was used for the magnetization rotation body layer 2. When a high-frequency excitation current is passed from the side of the main pole 5 to the side of the opposing pole 6, a spin torque acts on the magnetization rotation body layer 2 and magnetization rotates. This spin torque acts in a direction in which the magnetization component parallel to the rotation axis of the magnetization rotation body layer 2 that is generated due to the fringing field from the main pole 5 becomes smaller. In other words, this is because the magnetic flux rectifying layer 8 also acts as a spin rectifier for electrons, takes away electrons, whose spin is aligned in the magnetization direction of the main pole 5, from the magnetization rotation body layer 2 on the right, and a spin torque that tries to turn the magnetization of the magnetization rotation layer 2 in the opposite direction to the magnetization of the main pole 5 is at work. The spin torque effect becomes greater the greater the high-frequency excitation current (electron flow) becomes. It also becomes greater when approximately 1 nm of a CoFeB layer with high polarizability is inserted between the metal non-magnetic spin conduction layer 3 and adjacent layers.

It is noted that even if the magnetization of main pole 5 were reversed with the current held constant, it would still be the case that a spin torque that tries to turn the magnetization of the magnetization rotation layer 2 in the opposite direction to the magnetization of the main pole 5 is at work. Here, the rotation direction of the magnetization of the magnetization rotation layer 2 is in the opposite direction to the rotation direction before reversal of the magnetization direction of the main pole 5. When the width of the magnetization rotation body layer 2 is narrow due to increased recording density, the magnetic field created from the side surface of the magnetization rotation body layer 2 becomes significant such that it can no longer be ignored, and the direction of the magnetic field comes to rotate with time (a rotating oscillation magnetic field) at the recording medium 7. In this case, from a review of FIG. 3, it is necessary to control the rotation direction of this rotating oscillation magnetic field in such a manner that an anticlockwise oscillation field would be applied with respect to the magnetization that is to be switched. By using a write head part of the configuration in FIG. 19, the above-mentioned control of rotation direction is attained with the current held constant.

Although 2-nm-Cu was used for the metal non-magnetic spin conduction layer 3, Ru, or the like, which is a metal non-magnetic body with high spin conductance may also be used.

In the present embodiment, a negative perpendicular magnetic anisotropy body was used for the perpendicular magnetic anisotropy body layer. Here, "negative perpendicular magnetic anisotropy" refers to a state where the perpendicular magnetic anisotropy is negative. With respect to "positive perpendicular magnetic anisotropy," which is used in ordinary perpendicular magnetic recording media, it has, for example, such a property where magnetization tends to align in the direction of the hexagonal c-axis. In contrast, in "negative perpendicular magnetic anisotropy," because it has such a property where magnetization tends not to align in the c-axis direction, it is stable when magnetization lies in an in-plane direction that is perpendicular to the c-axis direction. By placing a magnetic body having negative perpendicular magnetic anisotropy adjacent to the magnetization rotation body layer 2, there occurs an effect of pinning the magnetization direction of the magnetization rotation body layer 2 in a direction perpendicular to the rotation axis. Here, the magnetization rotation axis is the direction in which the spin torque is directed and is perpendicular to the film plane.

For the negative perpendicular magnetic anisotropy body layer 11, the [001] plane of hexagonal CoIr was so arranged as to be in the left/right direction in the diagram, and one whose magnitude of magnetic anisotropy is $6.0 \times 10^5$ J/m$^3$ was used. In the present embodiment, because a CoFe alloy is used for the magnetization rotation body layer 2, strong exchange coupling is at work as in CoIr, and the effect of pinning the magnetization direction in a direction perpendicular to the rotation axis becomes stronger. When exchange coupling between the magnetization rotation body layer 2 and the negative perpendicular magnetic anisotropy body layer 11 is weak, because the effect of aligning the magnetization of the magnetization rotation body layer 2 in-plane is weakened, oscillation at high frequencies, in particular, becomes unstable. As magnetic bodies having negative perpendicular magnetic anisotropy, $\alpha'$-FeC, dhcp CoFe, NiAs-type MnSb, etc., are known besides hexagonal CoIr, and the negative perpendicular magnetic anisotropy body layer 11 may be formed using these materials. 3-nm-Pt was used for the metal non-magnetic spin scattering body 12. Similar effects are also present when Pd is used.

A patterned medium was used for the recording medium 7 wherein: after forming a continuous film on the substrate 19 through sputtering, a 6-nm-CoPt (L10) layer with a magnetic anisotropy field of 4.8 MA/m (60 kOe) was formed as the lower recording layer 18, a 6-nm-(CoPt) artificial lattice layer with a magnetic anisotropy field of 1.4 MA/m (17 kOe) was formed as the upper recording layer 17, and a magnetic body pattern, whose length was 9 nm in the track direction and 7 nm in the down-track direction, was formed with a track pitch of 12.5 nm and a bit pitch of 10.0 nm by means of nanoimprint lithography techniques. From measurements of absorption line width by way of ferromagnetic resonance, the damping factors $\alpha$ of the upper recording layer 17 and the lower recording layer 18 were 0.20 and 0.02, respectively. When Pt, Pd, or the like, is contained in the recording layer, $\alpha$ can be made greater, and magnetization switching speed can thus be increased.

The recording medium above was set on a spinstand, magnetic recording was carried out at a head-medium relative speed of 20 m/s, a head-medium spacing of 5 nm, and a track pitch of 12.5 nm, and, further, this was read by means of a GMR head with a shield gap of 18 nm. When the signal/noise ratio at 1,250 kFCI was measured while varying the high-frequency excitation current, up to 13.0 dB was attained, and it was found that recording/reading of a recording density exceeding 5 Tbits per square inch was well attainable. The high frequency in this case was 27.0 GHz.

Figure 21:
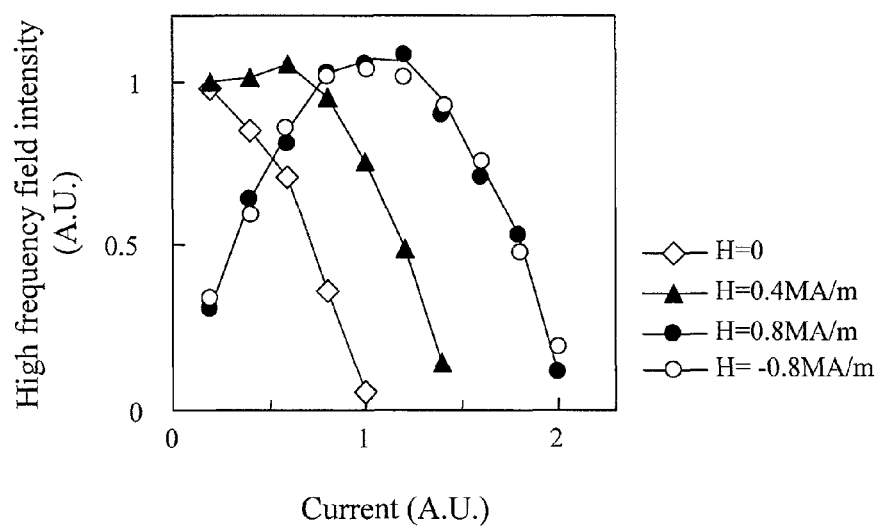
FIG. 21 is a diagram showing the high-frequency excitation current dependence of the high-frequency field intensity generated by the write head in FIG. 19.

With respect to a magnetic head thus produced, properties were evaluated by the same method as the method shown in FIG. 6. FIG. 21 is a diagram in which the excitation current dependence of the microwave magnetic field intensity generated from the magnetic head of the present embodiment is shown by comparing cases in which the external magnetic field intensity that leaks to the high-frequency magnetic field generator 201 from the main pole is 0 MA/m, 0.4 MA/m, 0.8 MA/m, and −0.8 MA/m, respectively.

When there is no external magnetic field, as the high-frequency excitation current increases, the high-frequency field intensity decreases monotonically. When the external magnetic field is 0.4 MA/m, as the high-frequency excitation current increases, the high-frequency field intensity increases slightly to reach a maximum value, and then decreases. When the external magnetic field is 0.8 MA/m, as the high-frequency excitation current increases, the high-frequency field intensity increases significantly to reach a maximum value, and then decreases. The maximum value for the high-frequency field intensity was approximately the same irrespective of the external magnetic field intensity. Further, it was found that oscillation did not become unstable due to changes in the external magnetic field intensity. It is speculated that this is because the magnetization rotation body layer 2 and the negative perpendicular magnetic anisotropy body 11 are naturally coupled. These phenomena can be understood readily by way of the direction of the vector sum of the downward spin torque and the external magnetic field injected under the influence of the magnetic flux rectifying layer 8, and the exchange coupling field from the negative perpendicular magnetic anisotropy body 11. When the vector sum is zero, the high-frequency field intensity assumes the maximum value, and the magnetization of the magnetization rotation body layer 2 at this point rotates within that layer.

Figure 22:
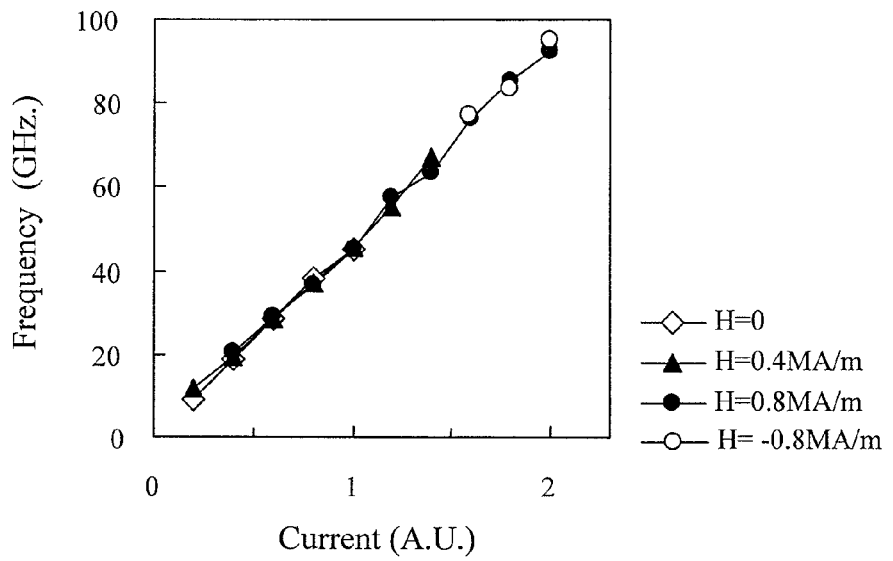
FIG. 22 is a diagram showing the high-frequency excitation current dependence of the frequency of the high-frequency magnetic field generated by the write head in FIG. 19.

FIG. 22 is a diagram in which the excitation current dependence of the frequency of the microwave magnetic field generated from the magnetic head of the present embodiment is shown by comparing cases in which the external magnetic field intensity that leaks to the high-frequency magnetic field generator 201 from the main pole is 0 MA/m, 0.4 MA/m, 0.8 MA/m, and −0.8 MA/m, respectively. From FIG. 22, it can be seen that the frequency of the generated microwave magnetic field is not dependent on the external magnetic field intensity and is dependent only on the high-frequency excitation current. It is speculated that this is because there is no instability in connection with the increase in the high-frequency excitation current, and that, consequently, oscillation at an extremely high frequency, namely, 100 GHz, is attained. Further, when layers of a material with high spin polarizability, such as CoFeB, etc., are disposed at the interfaces between the metal non-magnetic spin conduction layer 3 and the layers on both sides, spin torque is reinforced, and one would obtain a graph in which the horizontal axes in FIGS. 21 and 22 are compressed. For example, an oscillation frequency of 40 GHz is attained at a high-frequency excitation current value of 0.5, and 80 GHz at a current value of 1.0. Accordingly, in order to attain a frequency higher than the high-frequency magnetic field generator 201 shown in FIG. 16, it is necessary to make the fringing field from the main pole 5 stronger. This is to make it possible to attain at a greater high-frequency excitation current the requisite spin torque for making the magnetization rotation plane of the magnetization rotation body layer 2 parallel to the interface. Thus, when spin torque current is enhanced by inserting metal material layers with high spin polarizability, such as CoFeB, etc., at the interfaces with the metal non-magnetic spin conduction layer 3, higher frequencies are attained with the same high-frequency excitation current.

A head of the present embodiment has the following advantages because, in addition to the basic structure shown in FIG. 1C:

(1) it comprises a pair of lip layers, as a result of which it is possible to further suppress the in-plane component of the fringing field from the main pole that is applied to the magnetization rotation body layer 2, and oscillation of the microwave magnetic field stabilizes over a wider frequency band. Further, because the perpendicular component of the fringing field from the main pole that is applied to the magnetization rotation body layer 2 further increases, oscillation in a higher frequency band becomes possible, and oscillation in a wider bandwidth consequently becomes possible;

(2) there exists a negative magnetic anisotropy body layer, as a result of which even when the magnetization direction in the neutral state of the magnetization rotation body layer 2 (a state in which no current or magnetic field is applied) is aligned within a plane in which the magnetic field output becomes greatest, and a fringing field from the main pole is applied, the angle relative to the magnetization rotation axis is constant regardless of the polarity thereof. Consequently, asymmetry of output due to the polarity of the main pole is not manifested; and (3) by virtue of the spin scattering body layer 12, the flow of the spin torque from the opposing pole-side lip 13 into the magnetization rotation body layer 2 is suppressed, and the spin torque applied to the magnetization rotation body layer 2 is further stabilized.

Further, a magnetic head of the present embodiment, as compared to the magnetic heads described in Embodiments 1 and 2, is capable of attaining a stronger high-frequency magnetic field. In addition, because the oscillation frequency is generally linear with respect to the excitation current, controlling the magnetic head to form magnetic resonance (controlling the supplied current) is easy. Further, because there is no need to consider the polarity of the magnetic flux that leaks from the main pole, designing the head device is accordingly easier. In addition, a magnetic head of the present embodiment is capable of recording on a recording medium having large magnetic anisotropy without being limited by the frequency band attained by the high-frequency magnetic field source. Thus, when an information recording/reading apparatus is configured in combination with a magnetic recording medium, it becomes possible to increase recording density. In particular, through use in combination with a recording medium comprising an artificial lattice film with a high recording density, it becomes possible to further improve recording density.

Embodiment 4

In the present embodiment, there will be described a configuration example of an information recording apparatus wherein there is used, as in Embodiment 3, a magnetic head in which a negative perpendicular magnetic anisotropy body is used, and wherein the direction in which the excitation current is supplied with respect to the high-frequency magnetic field generator and the direction of magnetic head running are reversed with respect to Embodiment 3 (that is, a configuration in which the opposing pole is disposed on the leading side, and the main pole on the trailing side). It is noted that, in the present embodiment, it is assumed that the overall structure of the information processing apparatus is the same as in FIGS. 4(A) and (B), and that the overall structure of the magnetic head comprises one of the structures shown in FIG. 14. However, no significant difference in the attained signal/noise ratio was observed even when the direction of head running shown in FIG. 14 was horizontally reversed.

Figure 23:
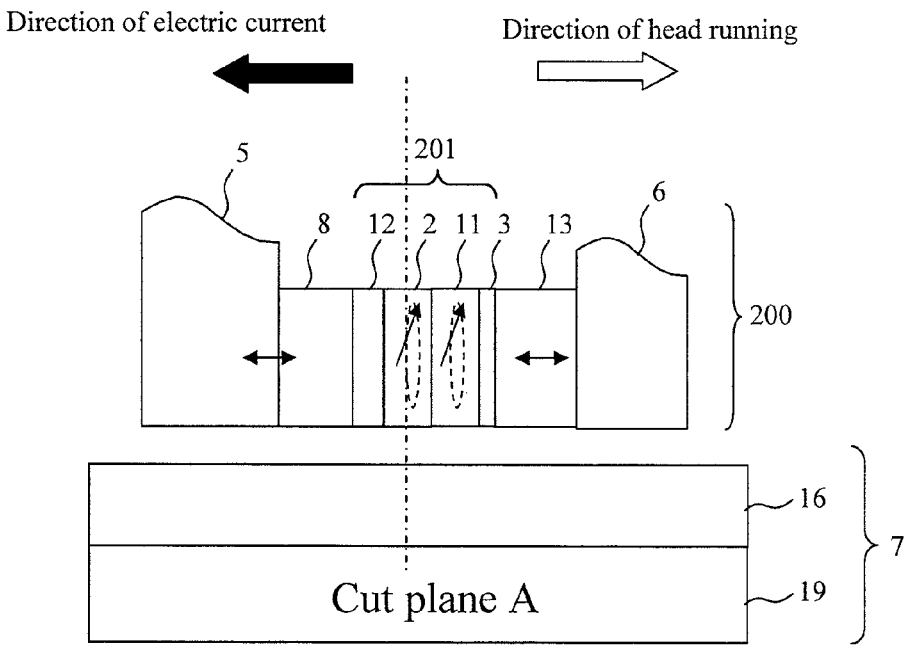
FIG. 23 is a configuration diagram of a write head part of Embodiment 4.

FIG. 23 is a view showing the sectional structure of a write head part of an information recording apparatus of the present embodiment. The configurations/functions of the main pole 5, the opposing pole 6, the magnetic flux rectifying layer 8, the second magnetic flux rectifying layer 13, and the high-frequency magnetic field generator 201 are generally similar to those in FIG. 19, and descriptions will accordingly be omitted for common parts. However, in the case of the present embodiment, the stacking order for the metal non-magnetic spin conduction layer 3 and the metal non-magnetic spin scattering body layer 12 is just the opposite of that in FIG. 19. However, with respect to the magnetization rotation body layer 2 and the negative perpendicular magnetic anisotropy body layer 11, favorable microwave oscillation properties are attained even when the stacking order is reversed. When the magnetization rotation body layer 2 is on the side of the main pole 5 as in the present embodiment, a stronger microwave is attained in the magnetization switching region of the recording medium. On the contrary, when the magnetization rotation body layer 2 is on the side of the opposing pole 6, the spin torque in-flow rate from the second magnetic flux rectifying layer 13 increases, and the current required for oscillation can thus be made smaller. The relationship between the sizes of the main pole and the high-frequency magnetic field generator 201 in the track width direction is similar to that in Embodiment 3.

The length of the magnetic field generator 201 in the longitudinal direction is 14 nm in the present embodiment. A 10-nm CoFe alloy was used for the opposing pole-side lip 13.

With the configuration of the high-frequency magnetic field generator set forth in the present embodiment, as compared to the configuration of the high-frequency magnetic field generator 201 shown in FIG. 19, since the spin torque acts directly on the negative perpendicular magnetic anisotropy body 11 from the stacked film of the metal non-magnetic spin conduction layer 3 and the second magnetic flux rectifying layer 13, which form a spin rectifier, its behavior at higher frequencies is stable, and the rising of oscillation also becomes faster. Further, as the magnetization direction of the second magnetic flux rectifying layer 13 is generally oriented in the direction of the rotation axis of the magnetization rotation body layer 2, the spin torque stabilizes, and it becomes possible to reduce the requisite current as compared to the configuration shown in FIG. 19. The spin torque increases as the high-frequency excitation current (electron flow) increases, and also increases when approximately 1 nm of a CoFeB layer with high polarizability is inserted between the second magnetic flux rectifying layer 13 and the metal non-magnetic spin conduction layer 3. It is noted that in the present embodiment, a plurality of magnetic heads with varying fringing fields to the magnetization rotation body layer 2 were produced by adjusting the gap between the main pole 5 and the opposing pole 6. Further, with respect to the configuration of FIG. 23, it is also possible to vary the fringing field to the magnetization rotation body layer 2 by adjusting the length of the magnetic flux rectifying layer 8. By making the negative perpendicular magnetic anisotropy body 11 with high oblique fringing field resistance have half or more of the thickness of the magnetization rotation body layer 2, microwave oscillation was observed even when the length of the magnetic flux rectifying layer 8 was zero (i.e., a structure in which the main pole 5 and the metal non-magnetic spin scattering body layer 12 are adjacent without the magnetic flux rectifying layer 8).

For the recording medium 7, the following two kinds were prepared, namely a patterned medium and a continuous medium, whose magnetic properties of the recording layer were as follows.

(1) Recording Medium B-30 (Discrete Track Medium)
Magnetic anisotropy field: 2.4 MA/m (30 kOe), film thickness: 10 nm, material CoCrPt—SiOx
(2) Recording Medium B-34 (Continuous Medium)
Magnetic anisotropy field: 2.8 MA/m (34 kOe), film thickness: 10 nm, material: CoB/Pt (artificial lattice stacked film).
(3) Recording Medium B-45
Magnetic anisotropy field: 3.6 MA/m (45 kOe), film thickness: 10 nm, material: CoFe(L10)-SiOx layer With respect to recording medium B-30, after producing the recording layer 16 by a sputtering method, it was processed into DTM (Discrete Track Media), i.e., a medium in which the recording part is continuous in the direction of head running, by way of nanoimprint lithography techniques. The width of the recording part in the track direction was 11 nm, and the track pitch was 15 nm.

Next, the above-mentioned recording media (1) to (3) were set on a spinstand, and test patterns were recorded at a predetermined recording density. Recording conditions were varied by varying the oscillation frequency of the microwave magnetic field. The head-medium relative speed during recording was 20 m/s, the head-medium spacing 5 nm, and the track pitch 18.0 nm. With respect to recording medium B-30, for purposes of track arrangement, the track pitch was made to be 15 nm.

The recorded pattern was read with a GMR head with a shield gap of 18 nm. When the recording density of the test pattern was 1,250 kFCI, the attained signal/noise ratio was as follows for each of the recording media.
(1) Recording medium B-30: maximum 13.5 dB (oscillation frequency of the microwave magnetic field: 48 GHz)
(2) Recording medium B-34: maximum 12.5 dB (oscillation frequency of the microwave magnetic field: 57 GHz)
(3) Recording medium B-45: maximum 14.5 dB (oscillation frequency of the microwave magnetic field: 75 GHz)

Further, with respect to recording medium B-45, when the signal/noise ratio at 1,500 kFCI was measured, 12.0 dB was attained. From the above, it was found that recording/reading was well attainable at recording densities exceeding 4 Tbits per square inch when a DTM-ized recording medium B-30 was used, 3.5 Tbits per square inch when recording medium B-34 was used, and 4.2 Tbits per square inch when recording medium B-45 was used.

As compared to a high-frequency magnetic field generator of Embodiment 3, with a high-frequency magnetic field generator of the present embodiment, since the spin torque acts directly on the negative perpendicular magnetic anisotropy body 11 from the stacked film of the metal non-magnetic spin conduction layer 3 and second magnetic flux rectifying layer 13, which form a spin rectifier, its behavior at higher frequencies is stable, and the rising of oscillation also becomes faster. Thus, writing to a discrete track medium or a continuous recording medium whose recording layer is a single layer becomes easier.

Embodiment 5

In the present embodiment, a description will be provided with respect to an example in which an information recording apparatus is configured using a magnetic head with the same structure as the magnetic head of Embodiment 3 but whose direction of head running is in the opposite direction (i.e., a configuration in which the opposing pole is disposed on the leading side and the main pole on the trailing side), and a patterned medium in which bit patterns formed of two kinds of magnetic materials with differing magnetic anisotropy intensities are alternately arranged in the track circumferential direction. In the present embodiment, it is assumed that the overall structure of the information processing apparatus is the same as in FIGS. 4(A) and (B), and that the overall structure of the magnetic head comprises one of the structures shown in FIG. 14. However, no significant differences were observed in the attained signal/noise ratio even when the direction of head running shown in FIG. 14 was horizontally inverted.

Figure 24:
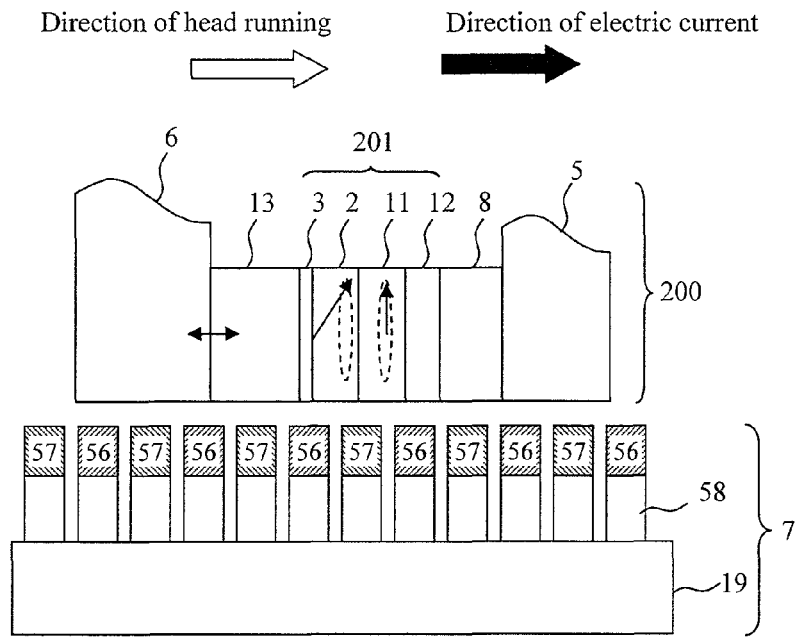
FIG. 24 is a configuration diagram of a write head part of Embodiment 5.

FIG. 24 is a diagram showing the configuration of a write head part of the present embodiment. The configurations/functions of the main pole 5, the opposing pole 6, the magnetic flux rectifying layer 8, the second magnetic flux rectifying layer 13, and the high-frequency magnetic field generator 201 are generally similar to those in FIG. 23, and descriptions will accordingly be omitted for common parts. However in the case of the present embodiment, the stacking order for the magnetization rotation body layer 2 and the negative perpendicular magnetic anisotropy body layer 11 is just the opposite of that in FIG. 23.

The recording medium 7 was produced by continuously forming, on the substrate 19 and through sputtering, a lower recording layer 58 and a first upper recording layer 56, and thereafter disposing, with a track pitch of 12.5 nm and a bit pitch of 8.0 nm, a magnetic body pattern, whose length is 9 nm in the track direction and 5 nm in the down-track direction, by way of nanoimprint lithography techniques. Next, by way of nanoimprint lithography techniques, the first upper recording layer 56 was alternately removed, and a second upper recording layer 57 was formed. A CoPt(L10) layer with a magnetic anisotropy field of 4.8 MA/m (60 kOe) and a film thickness of 6 nm was used for the lower recording layer 58, a (Co/Pt) artificial lattice layer with a magnetic anisotropy field of 1.2 MA/m (15 kOe) and a film thickness of 5 nm for the first upper recording layer 56, and a (Co/Pt) artificial lattice layer with a magnetic anisotropy field of 2.4 MA/m (30 kOe) and a film thickness of 5 nm for the second upper recording layer 57. Damping factors a of the first upper recording layer 56, the second upper recording layer 57, and the lower recording layer 58 were 0.15, 0.20, and 0.05, respectively.

Next, recording/reading properties were evaluated using a spinstand. Patterns for evaluation were recorded with a head-medium relative speed of 20 m/s, a head-medium spacing of 5 nm, and a track pitch of 12.5 nm. First, a given track was DC-demagnetized, and a pattern was recorded in synchronization with the patterns of the first upper recording layer 56 and the second upper recording layer 57. Since recording was performed in synchronization with bit patterns, the polarity of the write magnetic field generated from the main pole 5 was switched every 16 nm. This write operation was performed while varying the oscillation frequency of the microwave magnetic field to determine with respect to each the high-frequency excitation current for which the read output became greatest. As a result, the optimal oscillation frequency for the first upper recording layer 56 was 27 GHz (hereinafter denoted by $I_1$), and the optimal oscillation frequency for the second upper recording layer 57 was 52 GHz (hereinafter denoted by $I_2$).

Next, the high-frequency excitation current value was intensity-modulated between $I_1$ and $I_2$ in synchronization with the patterns of the first upper recording layer 56 and the second upper recording layer 57 in order to record, and this was further read with a GMR head with a shield gap of 16 nm. When the signal/noise ratio at 1,560 kFCI was measured, up to 13.0 dB was attained, and it was found that recording/reading at a recording density exceeding 6 Tbits per square inch was well attainable. In a magnetic disk apparatus such as that shown in FIG. 4, a high-frequency excitation current value at which the signal/noise ratio becomes greatest is stored in a memory 111, a register within a processor, or the like, and a current amplifier is controlled based on that stored value. Alternatively, high-frequency excitation current values $I_1$ and $I_2$ corresponding to track kind may be stored in the memory 111, and when the drive is turned on, etc., a write operation for a test pattern may be performed on a predetermined area (management area, etc) of the recording medium by modulating within high-frequency excitation current values $I_1$ and $I_2$, and this test pattern may be read to determine the optimal excitation current value. The first upper recording layer 56 or the second upper recording layer 57 may also be independently written on at high-frequency excitation current value $I_1$ or $I_2$, respectively. When the recording state of the other is known, the error correction perfoimance during reading improves.

Embodiment 6

Figure 25:
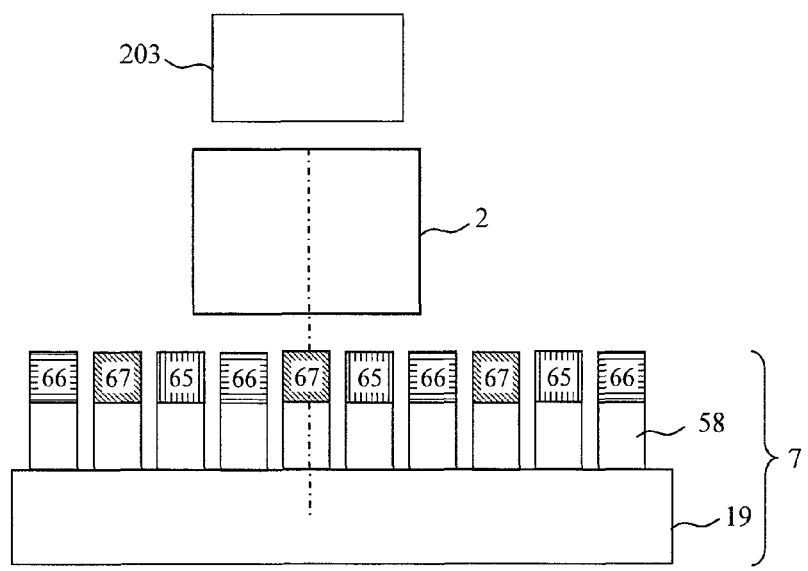
FIG. 25 is a configuration diagram of a write head part of Embodiment 6.

In the present embodiment, there will be described an example in which an information recording apparatus is configured using a discrete track medium. FIG. 25 shows a sectional view of a write head part of the present embodiment as seen from the track circumferential direction. It is assumed that the configuration of the write head part of the present embodiment is the same as in Embodiment 2. FIG. 25 shows a sectional view with respect to the magnetization rotation body layer 2. In the diagram, the high-frequency magnetic field detector 203 monitors the oscillation state of the high-frequency magnetic field generator 201 during write operations and comprises a similar structure to that of the high-frequency magnetic field detector 202 located in the right-side portion of FIG. 6. The length of the high-frequency magnetic field generator 201 in the longitudinal direction is 21 nm. By making this length longer, the curvature of the magnetic field distribution within the medium of the magnetization rotation body layer 2 becomes smaller relative to the width of one discrete track, and the magnetization transition shape thus improves.

In the present embodiment, for the recording medium 7, there was used a recording medium of such a structure where there are arranged three tracks with differing magnetic anisotropy fields in the track width direction. With respect to the three tracks, after the lower recording layer 58 and a first upper recording layer 65 were continuously formed on the substrate 19 through sputtering, a track belonging to the first upper recording layer, a track belonging to the second upper recording layer, and a track belonging to the third upper recording layer were sequentially formed while sequentially removing unwanted upper recording layer material per track using nanoimprint lithography techniques in the manner described in Embodiment 5. The tracks thus formed had a track width of 4.5 nm, a pitch between adjacent tracks of 6 nm, and a track pitch of 18.0 nm where one cycle comprised the track belonging to the first upper recording layer to the track belonging to the third upper recording layer. The materials forming the respective recording layers were as follows.

Lower recording layer 58: CoPt(L10) with a magnetic anisotropy field of 4.8 MA/m (60 kOe) and a film thickness of 6 nm.

First upper recording layer 65: (Co/Pt) artificial lattice layer with a magnetic anisotropy field of 1.2 MA/m (15 kOe) and a film thickness of 5 nm.

Second upper recording layer 66: (Co/Pt) artificial lattice layer with a magnetic anisotropy field of 2.4 MA/m (30 kOe) and a film thickness of 5 nm.

Third upper recording layer 67: (Co/Pt) artificial lattice layer with a magnetic anisotropy field of 3.6 MA/m (45 kOe) and a film thickness of 5 nm.

It is noted that damping factors $\alpha$ of the first upper recording layer 65, the second upper recording layer 66, the third upper recording layer 67, and the lower recording layer 58 were 0.15, 0.20, 0.21, and 0.05, respectively.

When recording/reading properties were evaluated using a spinstand under the conditions of a head-medium relative speed of 20 m/s, a head-medium spacing of 6 nm, and a track pitch of 18 nm, and the signal/noise ratio at 1,000 kFCI was measured, up to 13.0 dB was attained, and it was found that recording/reading at a recording density exceeding 6 Tbits per square inch was well attainable. In addition, the optimal oscillation frequencies for the respective upper recording layers were as follows.

First upper recording layer: 27 GHz (hereinafter denoted by $I_1$)

Second upper recording layer: 52 GHz (hereinafter denoted by $I_2$)

Third upper recording layer: 76 GHz (hereinafter denoted by $I_3$)

The first upper recording layer 65 or the second upper recording layer 66 may also be independently written on at high-frequency excitation current value $I_1$ or $1_2$, respectively. When the recording states of the others are known, the error correction performance during reading improves. In addition, as in Embodiment 5, the excitation current optimal values of $I_1$ to $I_3$ mentioned above may be stored in the information reading apparatus to control the excitation current value. Also, as in Embodiment 5, a test write sequence may be executed when the power is turned on.

Thus, in the case of an information recording apparatus of the present embodiment, as it is possible to increase the length of the magnetization high-speed rotation body in the track width direction, the curvature of the magnetic field distribution generated by the magnetization rotation body becomes smaller relative to the width of one discrete track. Consequently, steeper magnetization transitions (granular continuous media, discrete track media), and a decrease in write errors (bit patterned media) can be expected, and an improvement in track density can also be expected. Further, when the same structure is provided in the direction of head running (when the gap between the main pole and the opposing pole is made longer), an improvement in linear recording density can be expected.

The invention claimed is:

1. An information recording apparatus comprising a magnetic recording medium, on which user data is to be stored, and a magnetic head, which comprises a write head part that performs a write operation with respect to the magnetic recording medium, wherein a magnetically resonant state is created with respect to the magnetic recording medium to perform the recording by applying to the magnetic recording medium a high-freguencv magnetic field and a write magnetic field that corresponds to the user data, wherein the write head part comprises:

a main pole that generates the write magnetic field; and an opposing pole provided in separation from the main pole on either a trailing side or leading side of the main pole, wherein the main pole comprises a protruding part on either a trailing side or a leading side of an end part on the air bearing surface side with respect to the magnetic recording medium, and the write head part further comprises, between the protruding part and the opposing pole: a spin rectifier; a magnetization rotation body layer whose magnetization direction is rotatable within a film plane; and, wherein the protruding part comprises a rectifying action with respect to magnetic flux that passes between the main pole and the opposing pole, wherein a material with equal as or greater than saturation magnetization of the main pole is used for the protruding part, wherein the rotation guide layer is a negative perpendicular magnetic anisotropy film whose magnetization direction is in a direction within the film plane.

2. An information recording apparatus according to claim 1, wherein the rotation guide layer comprises a perpendicular magnetic anisotropy film whose magnetization direction is in a direction that is perpendicular to the film plane.

3. An information recording apparatus according to claim 1, wherein the opposing pole comprises a protruding part on the side of an air bearing surface end part facing the main pole, and the spin rectifier and the magnetization rotation body layer whose magnetization direction is rotatable within the film plane are disposed between the protruding part of the main pole and the protruding part of the opposing pole.

4. An information recording apparatus according to claim 1, further comprising means configured to control a current amount of an excitation current to be applied between the main pole and the opposing pole.

5. An information recording apparatus according to claim 1, wherein a recording layer of the magnetic recording medium comprises at least two layers including an upper magnetic layer and a lower magnetic layer, and a magnetic anisotropy field of the upper magnetic layer is smaller than a magnetic anisotropy field of the lower magnetic layer.

6. An information recording apparatus comprising a magnetic recording medium, on which data is to be stored, and a magnetic head, which comprises a write head part that performs a write operation with respect to the magnetic recording medium, wherein a magnetically resonant state is created with respect to the magnetic recording medium to perform the recording by applying to the magnetic recording medium a high-frequency magnetic field and a write magnetic field that corresponds to the user data, wherein the write head part comprises:

a main pole that generates the write magnetic field; and an opposing pole provided in separation from the main pole, wherein the write head part further comprises, between the main pole and the opposing pole, at least a negative perpendicular magnetic anisotropy body layer whose magnetization rotates.

7. The information recording apparatus according to claim 6, wherein magnetization of the negative perpendicular magnetic anisotropy body layer rotates in plane.

8. The information recording apparatus according to claim 6, wherein a metal non-magnetic spin conduction layer is further provided between the main pole and the opposing pole.

9. The information recording apparatus according to claim 8, wherein the negative perpendicular magnetic anisotropy body layer and the metal non-magnetic spin conduction layer are formed in contact with each other.

10. The information recording apparatus according to claim 6, wherein a magnetic flux rectifying layer is further provided between the main pole and the opposing pole.

11. The information recording apparatus according to claim 6, wherein a spin rectifier is further provided.

12. An information recording apparatus comprising a magnetic recording medium, on which data is to be stored, and a magnetic head, which comprises a write head part that performs a write operation with respect to the magnetic recording medium, wherein a magnetically resonant state is created with respect to the magnetic recording medium to perform the recording by applying to the magnetic recording medium a high-frequency magnetic field and a write magnetic field that corresponds to the user data, wherein a recording layer of the magnetic recording medium comprises at least two layers including an upper magnetic layer and a lower magnetic layer, and a magnetic anisotropy field of the upper magnetic layer is smaller than a magnetic anisotropy field of the lower magnetic layer.

13. The information recording apparatus according to claim 12, wherein the write head part comprises:

a main pole that generates the write magnetic field; and an opposing pole provided in separation from the main pole, wherein the write head part further comprises, between the main pole and the opposing pole, at least a negative perpendicular magnetic anisotropy body layer whose magnetization rotates.

14. The information recording apparatus according to claim 13, wherein a metal non-magnetic spin conduction layer is further provided between the main pole and the opposing pole.

15. The information recording apparatus according to claim 1, wherein a rotation guide layer that is in contact with the magnetization rotation body layer and guides the magnetization direction of the magnetization rotation body layer.

16. The information recording apparatus according to claim 12, wherein a frequency f of the high-frequency magnetic field is approximately 70% of magnetic resonance oscillation frequency $\gamma Hk/2\pi$ when $\gamma$ denotes a gyromagnetic constant.

* * * * *